(12) United States Patent
Morizono et al.

(10) Patent No.: US 8,104,371 B2
(45) Date of Patent: Jan. 31, 2012

(54) DIAL CONTROL DEVICE

(75) Inventors: Kazunori Morizono, Hamamatsu (JP);
Makito Fukazawa, Hamamatsu (JP);
Yasuo Nemoto, Hamamatsu (JP)

(73) Assignee: U-Shin Ltd., Tokyo (JP)

( * ) Notice: Subject to any disclaimer, the term of this patent is extended or adjusted under 35 U.S.C. 154(b) by 394 days.

(21) Appl. No.: 12/207,656

(22) Filed: Sep. 10, 2008

(65) Prior Publication Data
US 2009/0084220 A1 Apr. 2, 2009

(30) Foreign Application Priority Data

Sep. 28, 2007 (JP) ................. 2007-253060
Mar. 6, 2008 (JP) ................. 2008-055996
Apr. 23, 2008 (JP) ................. 2008-112107

(51) Int. Cl.
*B60K 20/00* (2006.01)
(52) U.S. Cl. .................................................. 74/473.3
(58) Field of Classification Search ............... 74/473.3, 74/501.6, 505, 506, 553; 251/213, 248; 475/3, 475/349; 116/284, 306, 309
See application file for complete search history.

(56) References Cited

U.S. PATENT DOCUMENTS 4,656,926 A * 4/1987 Bauer et al. .................. 454/143
5,218,879 A * 6/1993 Lyons ......................... 74/471 R

FOREIGN PATENT DOCUMENTS

| JP | 03276320 A | * | 12/1991 |
| JP | 2003-267034 A | | 9/2003 |
| JP | 2004-210019 A | | 7/2004 |
| JP | 2006227873 A | * | 8/2006 |

* cited by examiner

*Primary Examiner* — Vicky Johnson
(74) *Attorney, Agent, or Firm* — Hogan Lovells US LLP

(57) ABSTRACT

The present invention aims to provide a dial control device having a maneuverability of a control knob improved by making this in cylindrical shape and downsized by disposing another control knob installed within the first-mentioned cylindrical control knob. A dial control device comprising: a cylindrical control knob, a sun gear rotating integrally with said control knob for transmission of a driving force from said control knob, a planet gear interlocking with said sun gear, an internal gear cooperating with said sun gear to guide said planet gear in a direction of its movement, and a control cable coupled to said planet gear so as to operate an external device, wherein said driving force generated by rotational operation of said control knob is transmitted via said sun gear, said planet gear and said control cable to the external device to control operation of said external device.

14 Claims, 34 Drawing Sheets

FIG. 20
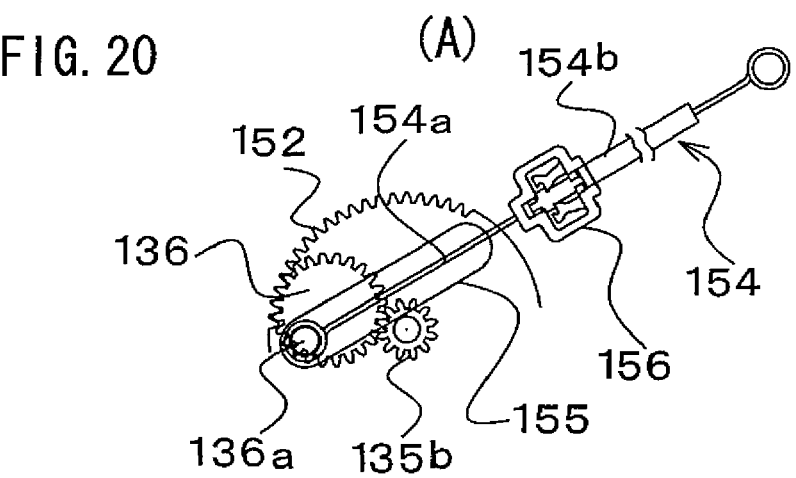
(A)
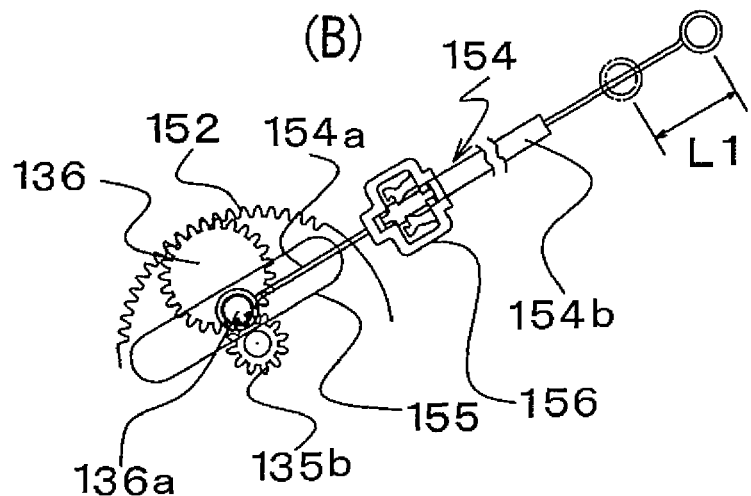
(B)
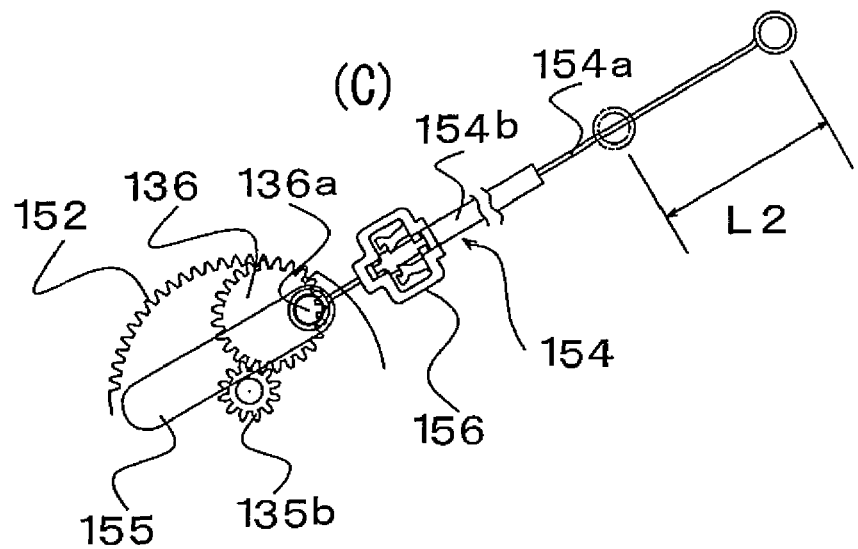
(C)

DIAL CONTROL DEVICE

CROSS-REFERENCE TO RELATED APPLICATIONS

This application claims the benefit of priority under 35 USC 119 of Japanese Patent Application No. 2007-253060, filed Sep. 28, 2007, Japanese Patent Application No. 2008-055996, filed Mar. 6, 2008, and Japanese Patent Application No. 2008-112107, filed Apr. 23, 2008 which are incorporated herein by reference.

BACKGROUND OF THE INVENTION

Dial control device functioning to transmit driving force generated by rotary operation of a control knob to an external device via a control cable and thereby to control operation of the external device.

BACKGROUND ART

While various types of dial control device have already been proposed, the dial control device for air conditioning unit of a motor vehicle of prior art will be discussed hereunder.

FIGS. 42 and 43 of the accompanying drawings illustrate the control device for air conditioning unit of a motor vehicle disclosed in Japanese Laid-Open Patent Application Gazette No. 2003-267034 wherein FIG. 42 is a front view of this device and FIG. 43 is a plan view thereof.

As will be apparent from FIGS. 42 and 43, a control knob 11 for wind direction regulation, a control knob 12 for airflow regulation and a control knob 13 for temperature regulation, each implemented in the form of so-called dial control knobs, are rotatably mounted on a control panel 10. This control panel 10 is additionally provided with a manual operation button 14 for rear defroster switch adapted to energize hot wire in the rear window, a manual operation button 15 for air conditioning switch for exchange of air conditioning mode, and a manual operation button 16 for exchange of indoor air circulation/outdoor air intake.

The control panel 10 is mounted on a housing 17a provided on a front side of a base 17 and a portion of the base 17 horizontally extending rearward from the housing 17a is provided with bearings 19, 25 adapted to support respective gear shafts 18, 24 of said control knobs 11, 13 in a rotatable manner.

Specifically, the control knob 11 is supported at one end of its gear shaft 18 which is, in turn, provided with a bevel gear 18a and the other end of the gear shaft 18 is supported by the bearing 19 mounted on the base 17.

The bevel gear 18a is engaged with a gear 20a of a gear lever 20 so that rotation of the control knob 11 may be transmitted to the gear lever 20.

The bevel gear 18a is engaged with a gear 20a of a gear lever 20 so that rotation of the control knob 11 may be transmitted to the gear lever 20.

The gear lever 20 is rotatably supported by a cylindrical bearing 21 formed on the base 17 and a control cable 22 for operation control of the air conditioning unit (not shown) is connected to an arm 20b of this gear lever 20.

In this way, rotational operation of the control knob 11 causes the gear lever 20 to be rotated in association with the bevel gear 18a so that an inner cable 22a of the control cable 22 is advanced or retracted so as to achieve wind direction regulation in the air conditioning unit.

The control cable 22 consists of an outer cable 22b and an inner cable 22a slidably contained in the outer cable 22b. The outer cable 22b is fixed at its one end to a clamp member 23 mounted on the base 17.

In a similar manner, the control knob 13 is supported at one end of its gear shaft 24 and the other end of the gear shaft 24 is supported by the bearing 25 mounted on the base 17. A bevel gear 24a mounted on this gear shaft 24 is engaged with a gear 27a of a gear lever 27 supported by a bearing 26. The control cable 28 is connected to an arm 27n of the gear lever 27.

In this way, the inner cable 28a of the control cable 28 is advanced or retracted as the control knob 13 is rotationally operated so as to achieve temperature regulation in the air conditioning unit.

The control cable 28 consists of, like the control cable 22, an inner cable 28a and an outer cable 28b wherein one end of the outer cable 28b is fixed to a clamp member 29 mounted on the base 17.

The control knobs 11, 12, 13 are provided with so-called operational feel giving mechanism adapted to stop rotation of the control knob temporarily at a desired step of rotation.

FIG. 44 is scale-enlarged partial sectional view taken along a line A-A in FIG. 42. As will be apparent from FIG. 42, a diameter-enlarged disc 18b provided on the gear shaft 18 is formed with an elongate pit 18c extending orthogonally to the rotational axis of the shaft and a small ball 31 is put in this pit 18c under biasing effect of a spring 30.

The base portion 17b rotatably supporting said diameter-enlarged disc 18b is formed with depressions adapted to receive said small ball 31 so that these depressions 32 cooperate with said small ball 31 to form the operational feel giving mechanism.

More specifically, the depressions 32 are formed in the base portion 17b surrounding the diameter-enlarged disc so as to correspond to symbols (See FIG. 42) 33a, 33b, 33c, 33d, 33e with which the indicator of the control knob is to be aligned.

When the control knob 11 is rotationally operated in order to align the indicator with the desired symbol, the small ball 31 is received in the depression corresponding to this desired symbol and a slight braking force (operational feel) is exerted on the rotational operation of the control knob 11.

The control knob may be rotated with an operating force overcoming such braking force to remove the small ball 31 from the depression and to enable the control knob to be rotated to the next depression.

The control knobs 12, 13 are also provided with the similar operational feel giving mechanism.

The control device as has been described hereinabove is designed so that a finger-grip projecting from the front surface of the control knob is held with the fingers to operate the knob. Consequentially, it has been difficult to transmit an operating force to the device and, with respect to maneuverability also, there has been a problem left behind.

To solve this problem, a control device having a cylindrical control knob has been proposed and disclosed, for example, by Japanese Laid-Open Patent Application Gazette No. 2004-210019.

FIG. 45 is a sectional view showing the control device of this type.

In this control device of prior art, a control knob for wind direction regulation, a control knob for airflow regulation and a control knob for temperature regulation are implemented in cylindrical control knobs and rotatably mounted on the control panel. In addition, respective buttons for a rear defroster switch, an air conditioning switch and an indoor air circulation/outdoor air intake exchanging switch are mounted on the control panel.

The sectional view illustrates the control knob 41 for wind direction regulation and a drive force transmitting system thereof.

As illustrated, the control panel 40 is provided with the control knob 41 in a rotatable manner and this control knob 41 is integrally provided on its outer periphery with a cylindrical interlocking gear 42.

A pair of interlocking gears 44, 45 mounted on shafts 43b, 43c projecting forward from a front 43a of the base 43 are engaged with an internal gear 42a of the interlocking gear 42 and these interlocking gears 44, 45 are engaged with an output gear 46.

The output gear 46 is integrally coupled to a gear shaft 47 and rotation of this output gear 46 drives a bevel gear 47a and swings a gear lever 48.

Specifically, rotational operation of the control knob 41 causes the gear lever 48 to be swung via the interlocking gear 42, the associated gears 44, 45, the output gear 46 and the bevel gear 47a and, in response to this, the inner cable of the control cable is advanced or retracted to achieve wind direction regulation in the air conditioning unit.

The control knob 41 contains therein a display member 50 adapted to be lighted by a bulb 49.

The control device of this type is generally provided with the operational feel giving mechanism as has been described above. This mechanism consists of a spring-biased small ball contained in the elongate pit formed in the outer periphery of the interlocking gear 42 rotating integrally with the control knob 41, said elongate pit extending in a direction orthogonal to the rotational axis of the interlocking gear 42, on one hand, and a plurality of depressions formed on the base 43 so as to correspond to the symbols toward which the control knob 41 is rotated.

The other control knobs are also provided with such operational feel giving mechanism.

The above cited control device is accompanied with problems as will be described below.

In the case of the control device adopting the control knob having a projecting finger-grip as illustrated by FIGS. 42, 43, if it is tried to mount a operating switch in the center of the control knob or to make the control knob in a ring-shape while a gear ratio between the bevel gear and the gear lever, an outer diameter of the bevel gear shaft will be enlarged in proportion to the size of the control knob and, in consequence, a diameter of the gear lever also will be enlarged.

In the case of the control device adopting the cylindrical control knob as illustrated by FIG. 45, the gear ratio is adjusted by providing the control knob with the interlocking gear serving as the sun gear and providing the output gear between the planet gear engaged with said interlocking gear and the gear lever. However, such countermeasure eventually leads to a reduction gear structure using many gears and inevitably complicates the construction as a whole.

In the recent motor vehicles, the number of devices such as operating switches and navigation devices increases day by day and the space available for the control device for air conditioning is correspondingly limited. In such situation, the conventional layout of the control device characterized by arranging three control knobs in a transverse direction can not more adapt the trend of the times.

The respective actuating parts have been scattered on the control panel and therefore it has been difficult to operate these parts by touch. In consequence, the maneuverability in the course of driving a motor vehicle has been relatively poor.

The control device provided with the cylindrical control knob is advantageous so far as handling of the control knob is concerned because of the operational feel giving mechanism consisting of the small ball provided on the side of the interlocking gear and the depressions formed on the base. However, the control device of prior art has been inevitably accompanied by the problem of backlash occurring between the interlocking gear 42 and the associated gears 44, 451 between these associated gears 44, 46 and the output gear 46, and/or between the bevel gear 47a and the gear lever 48. Such backlash may often lead to a stroke loss of the control cable and/or histeresis phenomenon. Sometimes it has been impossible to obtain a predetermined cable stroke.

Furthermore, if a diameter of the cylindrical control knob is enlarged, the interval of the operational feel giving means will be correspondingly enlarged, leading to the problem such that rotation of the control knob will be stopped at an intermediate position between each of the adjacent proper positions defined by the operational feel giving means and it will become difficult to align the indicator of the control knob with the desired symbol.

In view of the problem as has been described above, it is a principal object of the present invention to provide a dial control device having a cylindrical control knob and adapted to minimize an affection of a backlash possibly occurring between each pair of gears, in addition thereto, adapted for simplification as well as downsizing without deteriorating a desired maneuverability.

SUMMARY OF THE INVENTION

To achieve the object set fort above, the present invention proposes, on a first aspect, a dial control device comprising a cylindrical control knob, a sun gear rotating integrally with said control knob for transmission of a driving force from said control knob, a planet gear interlocking with said sun gear, an internal gear cooperating with said sun gear to guide said planet gear in a direction of its movement, and a control cable coupled to said planet gear so as to operate an external device, wherein said driving force generated by rotational operation of said control knob is transmitted via said sun gear, said planet gear and said control cable to the external device to control operation of said external device.

On a second aspect, the present invention proposes one preferred embodiment of the control device wherein said cylindrical control knob includes therein an operating switch adapted to perform an operational control independent from the operational control performed by said control cable.

On a third aspect, the present invention proposes another preferred embodiment of the control device comprising a base member rotatably supporting said control knob, a control cable having an outer cable slidably containing therein an inner cable, and a clamp member mounted on said base member and adapted to fix one end of said outer cable at a predetermined position, wherein said inner cable is connected to said planet gear at an eccentric location spaced from a rotational center of said planet gear and said clamp member is placed on an extension of a line connecting a pair of opposite ends of movement locus of said eccentric location within a rotatable range of said control knob.

On a fourth aspect, the present invention proposes another preferred embodiment of the control device comprising a base member rotatably supporting said control knob, a control cable having an outer cable slidably containing therein an inner cable, a clamp member mounted on said base member and adapted to fix one end of said outer cable at a predetermined position, an interlocking gear in the form of a bevel gear mounted around an outer periphery of said cylindrical control knob, a planet gear in the form of a spur gear and rotatably mounted on said base member, a sun gear including a bevel gear engaging said interlocking gear and a spur gear engaging said planet gear and rotatably supported by said base member, and an internal gear cooperating with said sun gear to guide said planet gear in a direction of its movement.

On a fifth aspect, the present invention proposes another preferred embodiment of the control device comprising a cylindrical control knob, a sun gear rotating in association with rotational operation of said control knob and transmitting a driving force from said control knob, a planet gear moving in association with said sun gear on a planar portion of a base member rotatably supporting said control knob and said sun gear, and a cable holder for a control cable coupled to said planet gear to control operation of an external device, wherein said planar portion of the base member is formed with an elongate notch and said planet gear is provided with a projecting connector adapted to be movably inserted into said notch and connected to said control cable behind said planar portion.

On a sixth aspect, the present invention proposes another preferred embodiment of the control device wherein said planar portion of the base member is formed with an elongate square U-shaped notch and said planet gear is provided with a projecting connector adapted to be movably inserted into said square U-shaped notch and connected to said control cable within said square U-shaped notch.

On a seventh aspect, the present invention proposes another preferred embodiment of the control device wherein said cylindrical control knob includes therein an operating member adapted to perform an operational control independent from the operational control performed by said control cable.

On an eighth aspect, the present invention proposes another preferred embodiment of the control device wherein: said control cable comprises an outer cable slidably containing therein an inner cable, said base member is provided with a cable holder adapted to fix one end of said outer cable, said planet gear is provided at an eccentric location spaced from its rotational center with a cable holder, said clamp member is placed on an extension of a line connecting a pair of opposite ends of movement locus of said eccentric location within a rotatable range of said control knob.

On a ninth aspect, the present invention proposes another preferred embodiment of the control device comprising: an interlocking gear in the form of a bevel gear mounted on an outer periphery of a cylindrical control knob, a planet gear formed by a spur gear and movably disposed on said base member, and a sun gear integrally consisting of a bevel gear adapted to engage with said interlocking gear and a spur gear having a diameter smaller than a diameter of said bevel gear and adapted to engage with said planet gear, said sun gear being rotatably supported by said base member with said spur gear placed aside toward the base member.

On a tenth aspect, the present invention proposes another preferred embodiment of the control device comprising: a cylindrical control knob, a sun gear in association with rotational operation of said control knob and serving for transmission of a driving force from said control knob, a planet gear moving in association with said sun gear on a planar portion of a base member rotatably supporting said control knob and said sun gear, and a cable holder for a control cable coupled to said planet gear to control operation of an external device, wherein a gear case provided with an internal gear cooperating with said sun gear to guide said planet gear in a direction of its movement is fixed to said base member, and wherein a driving force generated as said control knob is rotationally operated is transmitted via said sun gear, planet gear and control cable to an external device and thereby operation of the external device is controlled.

On an eleventh aspect, the present invention proposes another preferred embodiment of the control device comprising: an interlocking gear comprising a bevel gear mounted on an outer periphery of a cylindrical control knob, a planet gear comprising a spur gear and movably provided on said base member, and a sun gear consisting of a bevel gear adapted to engage with said interlocking gear and a spur gear adapted to engage with said planet gear and rotatably supported by said base member and said gear case.

On a twelfth aspect, the present invention proposes another preferred embodiment of the control device comprising: a cylindrical control knob, an interlocking gear in the form of a bevel gear integrally mounted on a outer periphery of said control knob, a sun gear adapted to engage with said interlocking gear and serving for transmission of a driving force from said control knob, a base member rotatably supporting said control knob, said interlocking gear and said sun gear is provided with a planet gear adapted to move in association with said sun gear, said base member is provided with an internal gear cooperating with said sun gear to guide said planet gear in the direction of its movement and with a control cable associated with said planet gear to operate an external device, and said planet gear is provided with an operational feel giving member adapted to be pressed against an operational feel giving member provided on said base member.

On a thirteenth aspect, the present invention proposes another preferred embodiment of the control device comprising: a cylindrical control knob, an interlocking gear in the form of a bevel gear integrally mounted on a outer periphery of said control knob, a sun gear adapted to engage with said interlocking gear and serving for transmission of a driving force from said control knob, a base member rotatably supporting said control knob, said interlocking gear and said sun gear is provided with a planet gear adapted to move in association with said sun gear, said base member is provided with an internal gear cooperating with said sun gear to guide said planet gear in the direction of its movement and with a control cable associated with said planet gear to operate an external device, said planar portion of the base member is formed with an elongate square U-shape notch and said planet gear is provided with a projecting connector adapted to be movably inserted into said square U-shape notch and to connect said control cable within said square U-shape notch to said planet gear, and said square U-shape notch is formed on its bottom with an operational feel giving mechanism comprising a plurality of depressions while said projecting connector is provided with an operational feel giving member adapted to be pressed against said depression under a biasing effect.

On a fourteenth aspect, the present invention proposes another preferred embodiment of the control device comprising: a cylindrical control knob, an interlocking gear in the form of a bevel gear integrally mounted on a outer periphery of said control knob, a sun gear adapted to engage with said interlocking gear and serving for transmission of a driving force from said control knob, abase member rotatably supporting said control knob, said interlocking gear and said sun gear is provided with a planet gear adapted to move in association with said sun gear, said base member is provided with a gear case including therein a control cable associated with said planet gear to operate an external device, said sun gear, said planet gear and an internal gear cooperating with said sun gear to guide said planet gear in a given direction, and said gear case is provided with an operational feel giving portions while said planet gear is provided with an operational feel giving member adapted to be pressed against said operational feel giving portions under a biasing effect.

On a fifteenth aspect, the present invention proposes another preferred embodiment of the control device wherein one of said sun gear and said gear case is provided with the operational feel giving portions while the other is provided with the operational feel giving member adapted to be pressed against said operational feel giving portions under a biasing effect.

EFFECT OF THE INVENTION

Effects provided by the present invention will be described with respect to the respective aspects of the invention.

The dial control device on the first aspect of the present invention comprises a cylindrical control knob, a sun gear rotating integrally with said control knob for transmission of a driving force from said control knob, a planet gear interlocking with said sun gear, an internal gear cooperating with said sun gear to guide said planet gear in a direction of its movement, and a control cable coupled to said planet gear so as to operate an external device. Such arrangement makes it possible to simplify the gear assembly.

The dial control cable (inner cable) is connected to the planet gear adapted to be moved by cooperation of the sun gear and the internal gear so that the control cable may be advanced or retracted in association with revolving of the planet gear. This feature allows a stroke of the control cable to increase. Consequently, the control device suitable for downsizing of the device configuration is obtained.

In the dial control device according to the first aspect of the invention, the control knob is cylindrical and this feature is advantageous in that, when operating switches are disposed within the cylindrical control knob as in the case of the second aspect of the invention, operation control by the control knob and the other operation control by the operating switches can be carried out in a consolidated fashion without interference with the gear assembly since the latter is simplified.

Thus it is possible for a single control knob to perform a plurality of operation control functions.

Operating portions of the operating switches can be arranged in a consolidated fashion, advantageously leading to improvement of functionality and space availability on the control panel.

On a third aspect, the present invention proposes the dial control device comprising a base member rotatably supporting said control knob, a control cable having an outer cable slidably containing therein an inner cable, and a clamp member mounted on said base member and adapted to fix one end of said outer cable at a predetermined position, wherein said inner cable is connected to said planet gear at an eccentric location spaced from a rotational center of said planet gear and said clamp member is placed on an extension of a line connecting a pair of opposite ends of movement locus (approximately rectilinear locus) of said eccentric location within a rotatable range of said control knob. With such arrangement, oscillation possibly occurring on the end of the inner cable due to revolving locus of the planet gear can be restricted since it is assured that the inner cable of the control cable moves substantially along a rectilinear locus. Compared to the case in which the inner cable is connected to the rotational center of the planet gear and revolves along a locus describing a circular arc, a flexural stress exerted on the inner cable can be alleviated and thereby the functionality of the control knob can be improved.

On a fourth aspect, the present invention proposes the dial control device comprising a base member rotatably supporting said control knob, a control cable having an outer cable slidably containing therein an inner cable, a clamp member mounted on said base member and adapted to fix one end of said outer cable at a predetermined position, an interlocking gear in the form of a bevel gear mounted around an outer periphery of said cylindrical control knob, a planet gear in the form of a spur gear and rotatably mounted on said base member, a sun gear including a bevel gear engaging said interlocking gear and a spur gear engaging said planet gear and rotatably supported by said base member, and an internal gear cooperating with said sun gear to guide said planet gear in a direction of its movement. Such construction is advantageous, like in the case of the control device on the first aspect of the invention, to downsize the control device.

This construction is suitable for the control device having the control cable extending in the direction intersecting with the direction in which the control knob is rotated.

On a fifth aspect, the present invention proposes the dial control device wherein the planar portion of the base member is formed with an elongate notch and the planet gear is provided with a projecting connector adapted to be movably inserted into said notch and connected to said control cable behind said planar portion.

Thereby a possibility that the projecting connector on the planet gear might interfere with the base member can be minimized. In addition, the space in which the projecting connector on the planet gear is movable can be commonly utilized with the space used to lay the control cable. In this way, the space available for the gear mechanism and the control cable can be significantly reduced.

It is also possible to replace the notch formed in the base member by the square U-shaped notch into which the projecting connector on the planet gear is inserted and to connect the control cable to the projecting connector within the square U-shape notch like in the case of the control device on the sixth aspect of the invention.

On a seventh aspect, the present invention proposes the dial control device wherein said cylindrical control knob contains therein an operating member adapted to perform an operational control independent from the operational control performed by said control cable. Such construction is advantageous from the viewpoint of the space availability for the device components as well as downsizing of the device as a whole.

It should be understood that the operating member for the operational control independent from the operational control performed by the control cable is not limited to the electric switch and, for example, it is also possible to replace the electric switch by a mechanism adapted to control the operation of the control cable.

On an eighth aspect, the present invention proposes the dial control device wherein the projecting connector is mounted on the planet gear at an eccentric location spaced from the rotational center of the planet gear so that the projecting connector moves along a rectilinear locus as the planet gear revolves and moves. In consequence, the control cable also can move rectilinearly.

Furthermore, the cable holder is disposed just on the extension of such locus of the projecting connector and thereby a flexural stress exerted on the control cable is drastically alleviated. Consequentially, the functionality of the control knob is significantly improved.

On a ninth aspect, the present invention proposes the dial control device comprising an interlocking gear in the form of a bevel gear mounted on an outer periphery of a cylindrical control knob, a planet gear formed by a spur gear and movably disposed on said base member, and a sun gear integrally consisting of a bevel gear adapted to engage with said interlocking gear and a spur gear having a diameter smaller than a diameter of said bevel gear and adapted to engage with said planet gear, said sun gear being rotatably supported by said base member with said spur gear placed aside toward the base member.

The unique gear placement such that the planet gear partially overlaps the bevel gear of the sun gear advantageously reduces the dimensions (a depth dimension of the device+a dimension of the device as measured in a direction of the rotational axes of the sun gear and the planet gear) of the gear assembly and thereby the space availability is improved so as to downsize the gear mechanism.

On a tenth aspect, the present invention proposes the dial control device having a unique construction that the gear case provided with the internal gear is fixed to the base member and the sun gear is rotatably supported by the gear case and the base member so as to prevent the planet gear from being out of engagement with the sun gear.

In this construction, the gear case serves as a bearing case for the internal gear cooperating with the sun gear to guide the planet gear and for the sun gear.

The gear case serves also to protect the gears from being injured due to any impact and being contaminated with dust.

On an eleventh aspect, the present invention proposes the dial control device which is suitable to lay the control cable in a direction intersecting with the direction in which the control knob is rotationally operated without making the gear mechanism bulky.

On a twelfth aspect, the present invention proposes the dial control device adapted to control the control cable by rotationally operating the cylindrical control knob and thereby to operate the external device. In addition, the device includes the operational feel giving mechanism consisting of the operational feel giving member provided on the planet gear and the associated operational feel giving depressions formed on the base member so that the stroke of the control cable precisely depends on the distance over which the planet gear moves.

In other words, the stroke of the control cable is substantially not affected by a backlash possibly occurring between the gears, allowing the dial control device to operate at a high accuracy.

In response to rotation of the control knob at relatively large intervals of the operational feel, the planet gear moves from one operational feel to a next operational feel at relatively short intervals. Therefore there is no anxiety that the planet gear might stop its movement before the control knob rotates to next operational feel and thus the maneuverability of the dial control device is correspondingly improved.

On a thirteenth aspect, the present invention proposes the dial control device wherein the operational feel giving mechanism consisting of the operational feel giving member provided in the projecting connector on the planet gear and the depressions arranged in the bottom of the square U-shaped notch formed in the base member through which the control cable is advanced or retracted. With such unique construction, the stroke of the control cable corresponds to the interval of the operational feel giving depressions.

In addition to the effect derived from the dial control device according to the first aspect of the invention, the dial control device can be easily designed depending on the specification of the external device.

On a fourteenth aspect, the present invention proposes the control device having the operational feel giving mechanism consisting of an operational feel giving depressions formed in the gear case and the associated operational feel giving member in the planet gear. Similarly to the dial control device according to the first aspect of the invention, the stroke of the control cable is substantially not affected by a backlash and it is not apprehended that the planet gear might stop its movement before the control knob rotates to the next operational feel. Furthermore, it is unnecessary to provide the operational feel giving depressions and the construction of the base member which would otherwise be complicated due to consolidation of various functions can be simplified.

On a fifteenth aspect, the present invention proposes the dial control device wherein one of the sun gear and the gear case is provided with the operational feel giving portions while the other is provided with the associated operational feel giving member.

Consequentially, this dial control device is inevitably affected by a backlash between the sun gear and the planet gear and an error occurring in the stroke of the control cable is more significant than in the case of the dial control devices according to the first, second and third aspects of the invention. However, such stroke error is substantially smaller than in the case of the dial control device of prior art.

BRIEF DESCRIPTION OF THE DRAWINGS

FIG. 20 is a diagram schematically illustrating a position at one side (A), a middle position (B) and a position at the other side (C) to which the planet gear rotationally moves as the control knob is operated in the control device according to the fifth embodiment.

DESCRIPTION OF THE PREFERRED EMBODIMENTS

Now several embodiments of the present invention in the form of the control device for air conditioning unit of a motor vehicle will be described in details with reference to the accompanying drawings.

Figure 1:
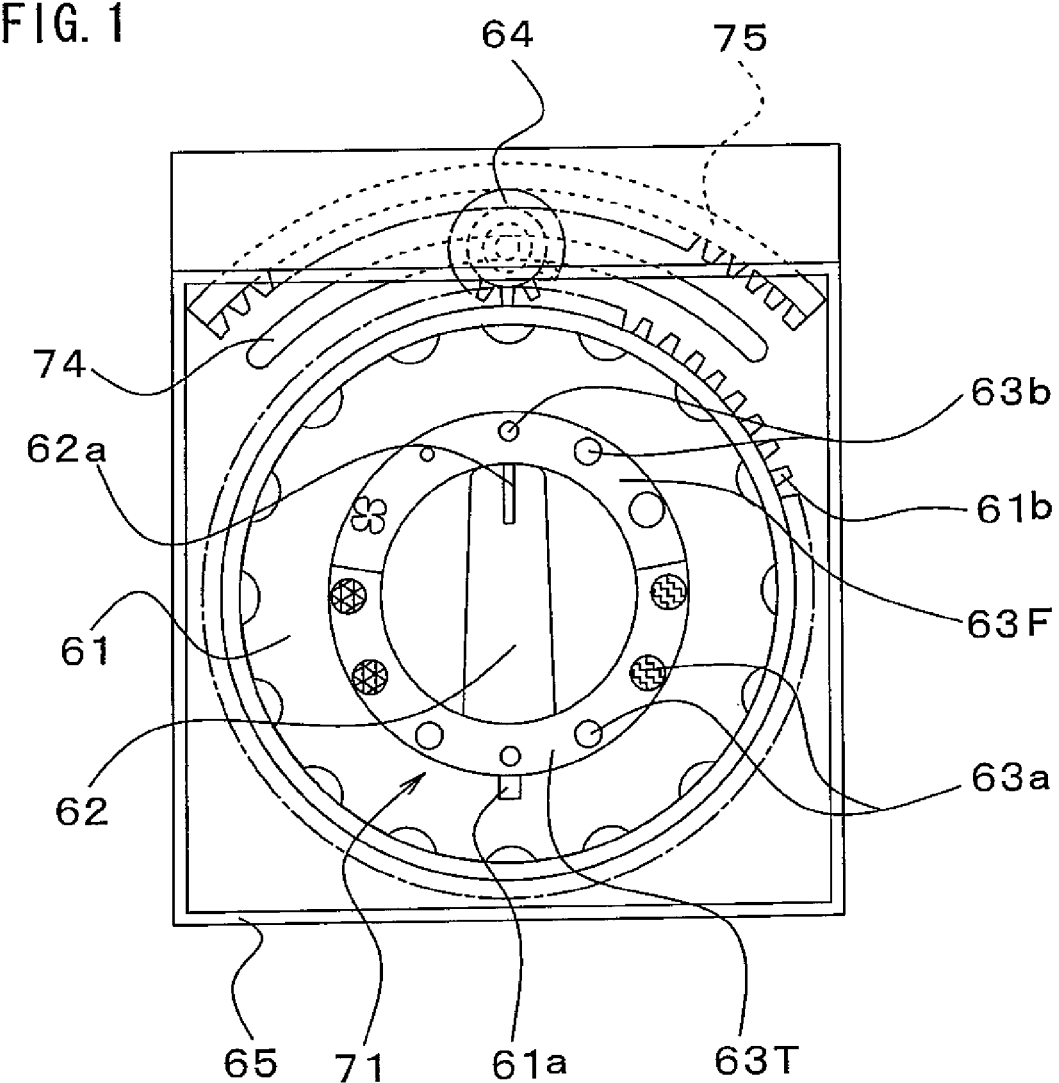
FIG. 1 is a front view showing the control device according to a first embodiment.
Figure 2:
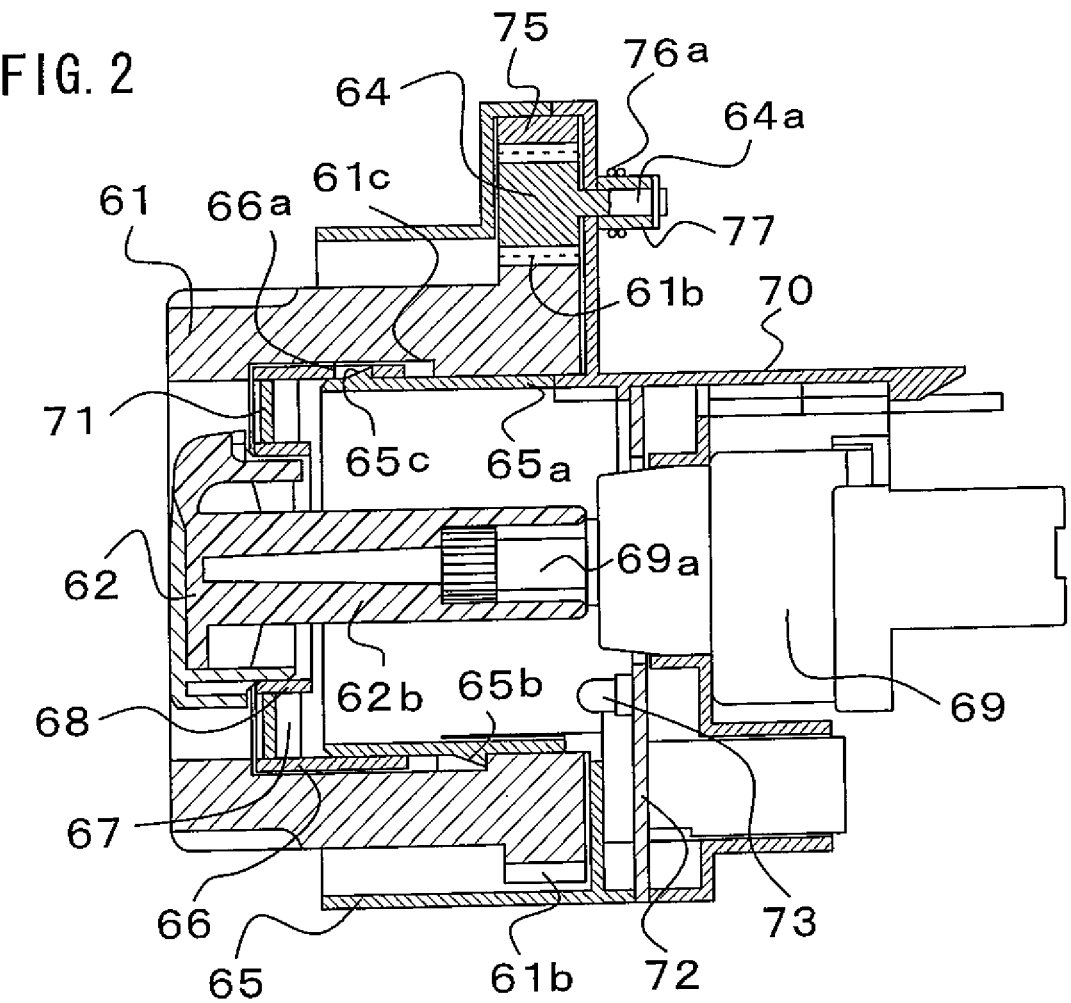
FIG. 2 is a sectional view showing the control device according to the first embodiment.
Figure 3:
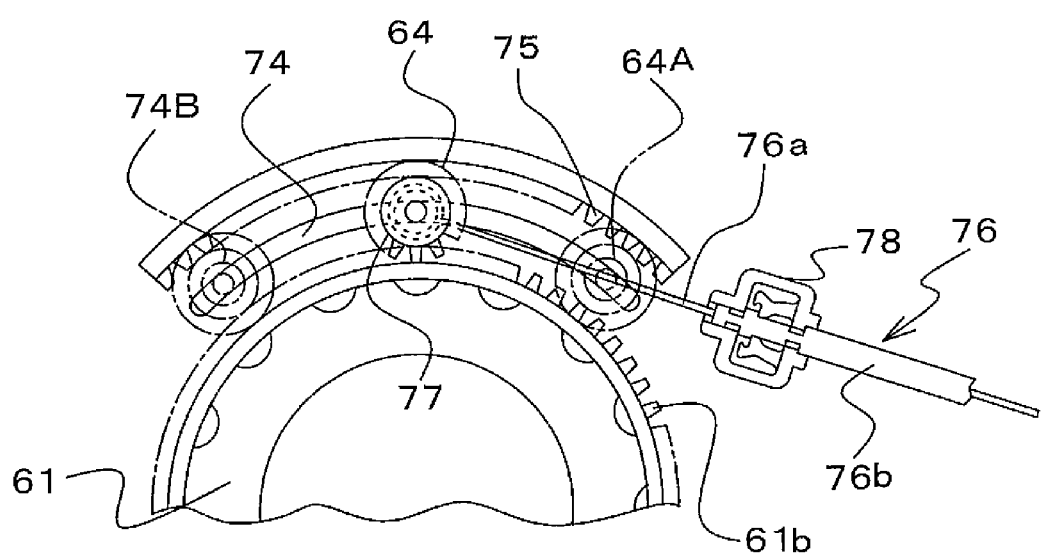
FIG. 3 is a diagram schematically illustrating an important part of the control device according to the first embodiment.

FIGS. 1, 2 and 3 illustrate a first embodiment wherein FIG. 1 is a front view of the control device, FIG. 2 is a sectional view of this control device and FIG. 3 is a diagram schematically illustrating an important part of the control device.

As shown, the control device comprises a cylindrical control knob 61 adapted to serve as the dial knob for temperature regulation and a control knob 62 in the form of a finger grip projection provided within the control knob 61 adapted to serve as the dial knob for airflow regulation.

The control knob 61 may be rotated until an indicator 61a is aligned with a desired one of symbols 63a arranged on a display 63T and thereby the temperature may be selectively regulated.

The control knob 62 may be rotated with the finger grip projection held by fingers until an indicator 62a is aligned with a desired one of symbols 63b arranged on a display 63F and thereby the airflow may be selectively regulated.

A rear portion of the cylindrical control knob 61 is formed on its outer peripheral surface with a sun gear 61b adapted to engage with a planet gear 64.

The control knob 61 is rotatably mounted around an outer periphery of a cylindrical portion 65a extending within a case 65 and provided with a click-stop mechanism (not shown) allowing the indicator 61a to be rotationally moved from the symbol 63a to the symbol 63a with operational feel.

While the control knob 61 may be rotatably supported by the cylindrical portion 65a extending within the case in various manners, according to this embodiment, the control knob 61 is formed on its inner peripheral surface with a ring-shaped concave portion 61c and the cylindrical portion 65a extending within the case is integrally formed with a stopper 65b adapted to engage with one end of the concave portion 61c to prevent the control knob 61 from dropping off.

Preferably, said stopper 65b is provided at a plurality of regions on the outer peripheral surface of the cylindrical portion 65a extending within the case.

An immovable cylindrical body 66 is fixed to the front of the cylindrical portion 65a extending within the case.

Specifically, the immovable cylindrical body 66 is provided with locking holes 66a and the stoppers 65b of the cylindrical body 65a are engaged with the associated locking holes 66a to fix the immovable cylindrical body 66 to the cylindrical portion 65a extending within the case.

The immovable cylindrical body 66 is provided within its front end with a plurality of radial bridging plates 67 by which an inner cylindrical body 68 is supported and the control knob 62 is rotatably inserted into this inner cylindrical body 68.

An operating shaft 69 of an airflow regulating switch 69 is fitted into a knob shaft 62b of the control knob 62.

The airflow regulating switch 69 is provided within a rear case 70.

On the front side of the bridging plates 67 extending between the immovable cylindrical body 66 and the inner cylindrical body 68, a display plate 71 carrying thereon the displays 63T, 63F are affixed.

In this display plate 71, the symbols 63*a*, 63*b* are translucent and the remaining region is non-translucent so that the symbols 63*a*, 63*b* are optically displayed as a lamp 73 mounted on a circuit substrate is turned on.

The case 65 is formed with a shaft guiding slot 74 describing a circular arc along which a gear shaft 64*a* of the planet gear 64 inserted therein is guided. This shaft guiding slot 74 cooperates with an internal gear 75 provided on the upper portion of the case 65 to guide rotary movement of the planet gear 64.

The gear shaft 64*a* projecting outward from the case 65 is provided with a connector member 77 for an inner cable 76*a* of a control cable 76.

This connector member 77 is rotatable with respect to the gear shaft 64*a*.

It should be noted that it is also possible to connect the inner cable 76*a* directly to the gear shaft 64*a* of the planet gear 64 without departing from the scope of the invention.

The control cable 76 may be of the well known type and comprises an outer cable 76*b* and the inner cable 76*a* slidably movable within the outer cable 76*b* wherein, as will be apparent from FIG. 3, one end of the outer cable 76*b* is fixed to a clamp member 78 provided on the case 65 and one end of the inner cable 76*a* is attached to said connector member 77.

In the control device as has been described above, the sun gear 61*b* rotates integrally with the control knob 61 as the latter is rotated and, in engagement with the sun gear 1*b*, the planet gear 64 moves in a range defined by positions 64A and 64B as illustrated by FIG. 3.

In this way, the inner cable 76*a* is advanced and retracted in response to movement of the planet gear 64, i.e., to rotary operation of the control knob 61 and thereby operation of the air conditioning unit as the external device is controlled to achieve the temperature regulation.

Figure 4:
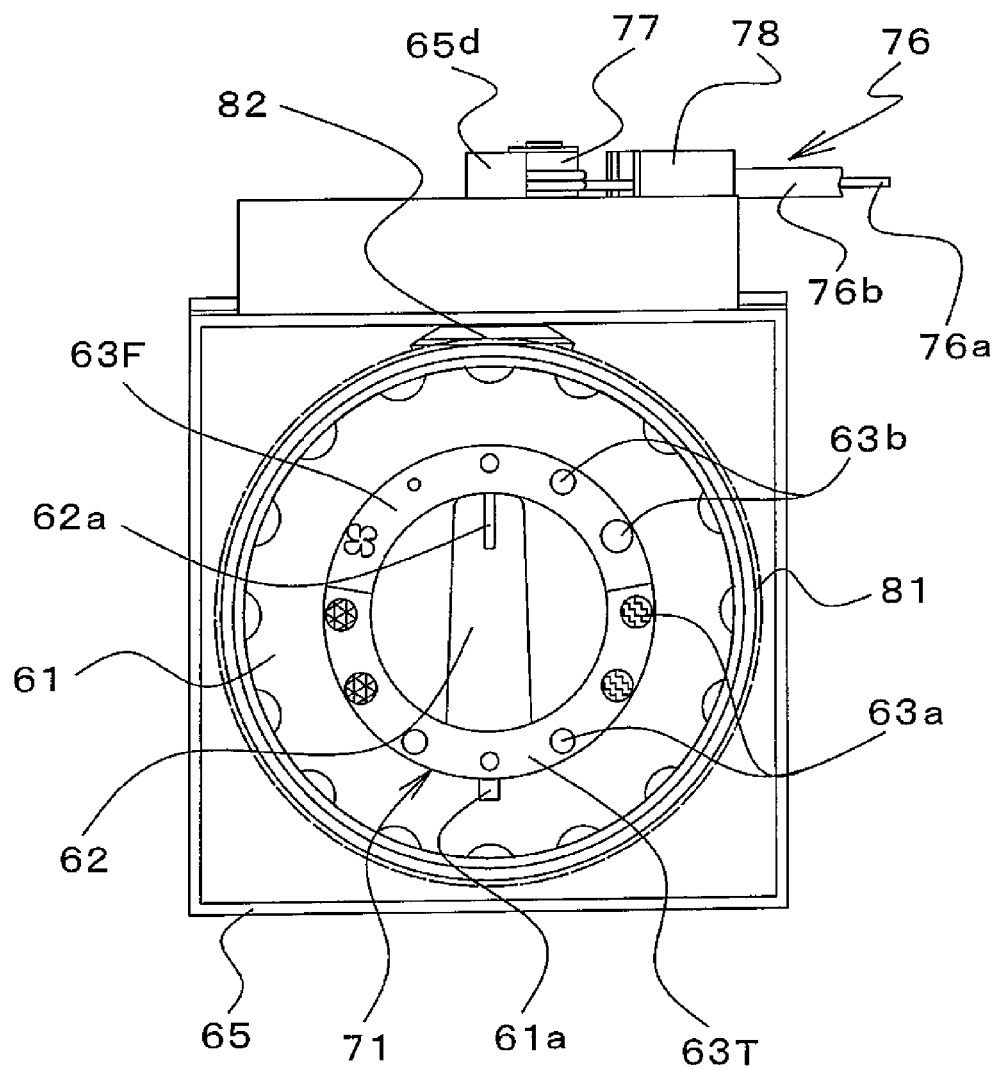
FIG. 4 is a front view showing the control device according to a second embodiment.
Figure 5:
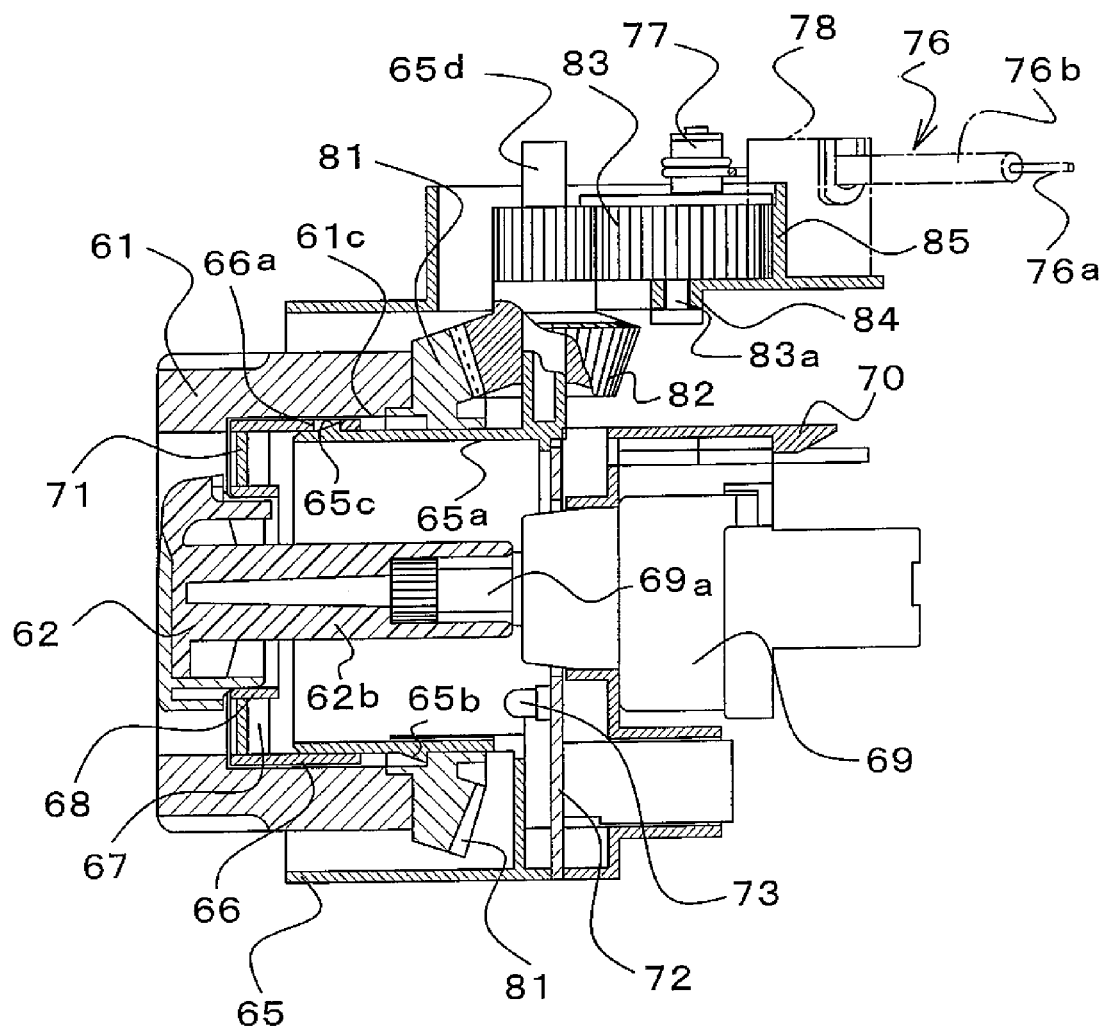
FIG. 5 is a sectional view showing the control device according to the second embodiment.
Figure 6:
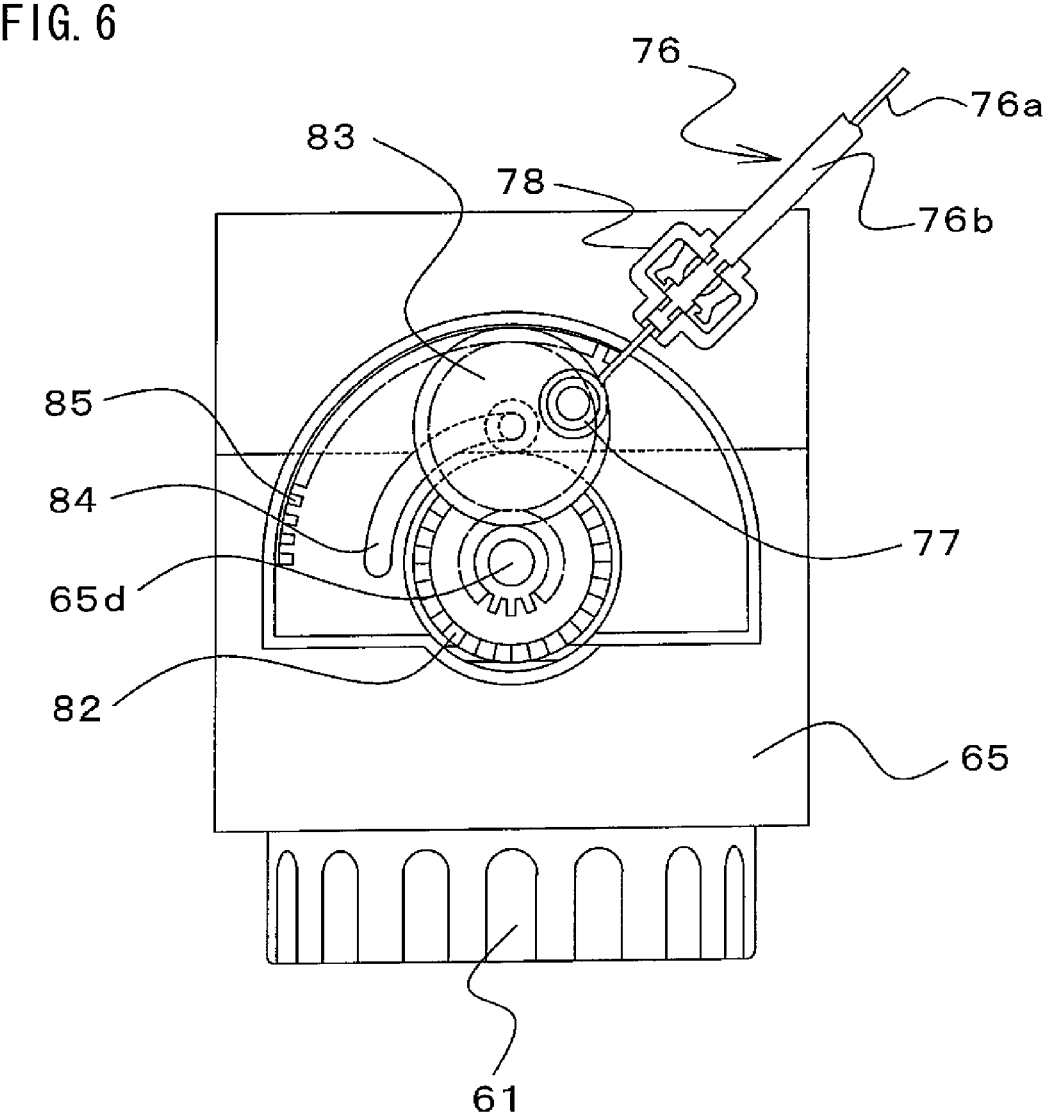
FIG. 6 is a plan view showing the control device according to the second embodiment.
Figure 7:
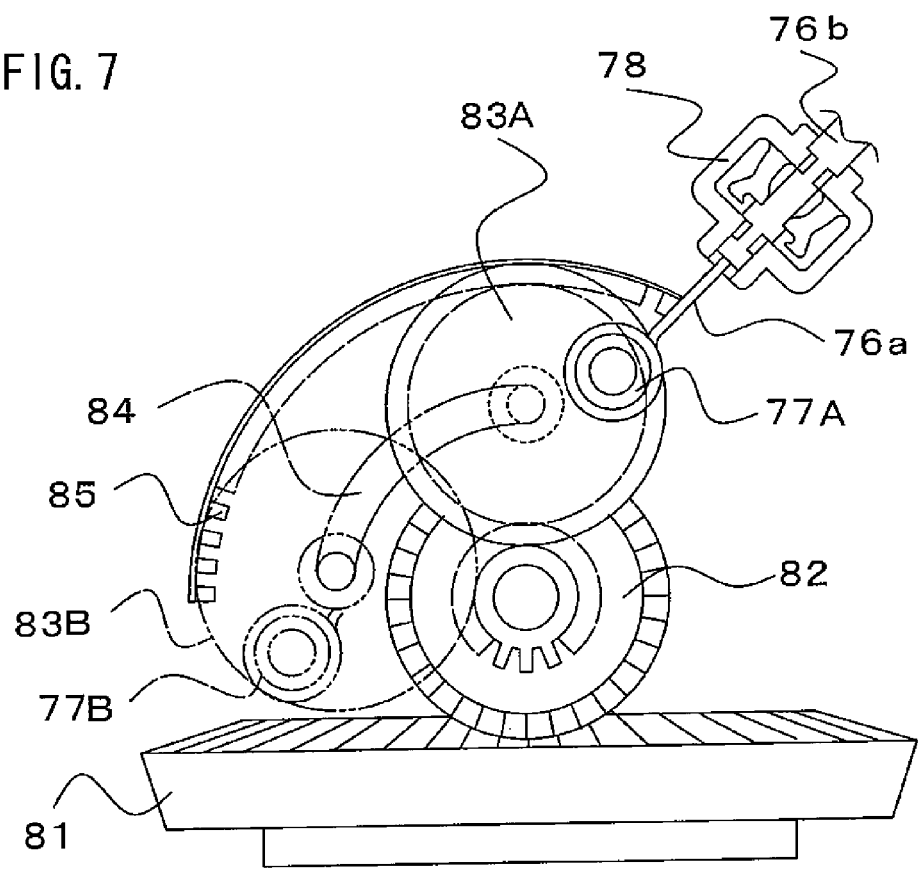
FIG. 7 is a diagram schematically illustrating an important part of the control device according to the second embodiment.

FIGS. 4 through 7 illustrate a second embodiment wherein FIG. 4 is a front view of the control device, FIG. 5 is a sectional view of the control device, FIG. 6 is a plan view of the control device and FIG. 7 is a diagram schematically illustrating an important part of the control device.

The present embodiment is similar to the first embodiment except that an interlocking gear 81 having a bevel gear is fixed to a rear end of the control knob 61 coaxially therewith, a sun gear 82 is engaged with said interlocking gear 81 and a planet gear 83 is engaged with the sun gear 82.

The sun gear 82 according to the present embodiment comprises the bevel gear engaged with the interlocking gear 81 and a spur gear engaged with the planet gear 83 wherein this sun gear 82 is rotatably supported by a gear shaft 65*d* set up integrally with the case 65.

The planet gear 83 has a gear shaft 83*a* inserted into a shaft guiding slot 84 formed in the case 65 and describing a circular arc around the gear shaft 65*d* of the sun gear 82. The planet gear 83 is moved by engaging with the bevel gear of the sun gear 82 and a circular arc-shaped gear mounted on the case 65.

According to the present embodiment, the connector member 77 for connection of the inner cable 76 of the control cable 76 is provided at an eccentric position with respect to the rotational center of the planet gear 83.

Thus the inner cable 76*a* is connected at the eccentric position of the planet gear 83 and the clamp member 78 is located on an extension of the line connecting opposite ends of rotary locus described by the connector member 77 located at said eccentric position within a rotatable range of the control knob 61.

The connector member 77 is rotatably attached to the planet gear 83.

The connector member 77 is preferably provided at the eccentric position spaced aside from the rotational center of the planet gear 83 toward the sun gear 82 at the neutral position of the planet gear 83 so that the connector member 77 may describe a locus of movement coming close to the sun gear 82.

Such design allows the clamp member 78 to be located closer to the sun gear 82 and thereby allows the case 75 to be downsized.

According to the second embodiment as has been described above, in response to rotational operation of the control knob 61, the sun gear 82 engaged with the interlocking gear 81 is rotated around the gear shaft 65*d*.

More specifically, the planet gear 83 interlocking with the spur gear of the sun gear 82 revolves around the sun gear 82 and moves in a range defined between a position 83A indicated by solid lines and a position 83B indicated by chain lines in FIG. 7 in response to rotational operation of the control knob 61.

According to the present embodiment, within a rotatable range of the control knob 61, the connector member 77 describes its rotation locus extending from the position 77A to the position 77B as shown by FIG. 7 in response to movement of the planet gear 83. The clamp member 78 is located on an extension of the line connecting opposite positions 77A, 77B of rotary locus described by the connector member 77.

In this way, the movement locus of the inner cable describes approximately linear locus and thereby a flexure stress generated in the inner cable can be alleviated.

In view of the fact that the clamp member 78 is fixed to the case 65, the connection member 77 is preferably mounted on the planet gear 83 in such a manner that a movement locus of the connector member 77 is described aside toward the sun gear 82.

Such design allows the clamp member 78 to be located closer to the sun gear 82 and thereby allows the case 75 to be downsized.

In the control device according to the second embodiment, the sun gear 82 is engaged with the interlocking gear 81 to be rotated around the gear shaft 65*d* and thereby the planet gear 83 is engaged with the sun gear 82 to be revolved around the sun gear 82.

In this way, the inner cable 76*a* of the control cable 76 is advanced and retracted in response to rotary movement of the interlocking member 77 and thereby operation of the air conditioning unit is controlled to achieve the temperature regulation.

Figure 8:
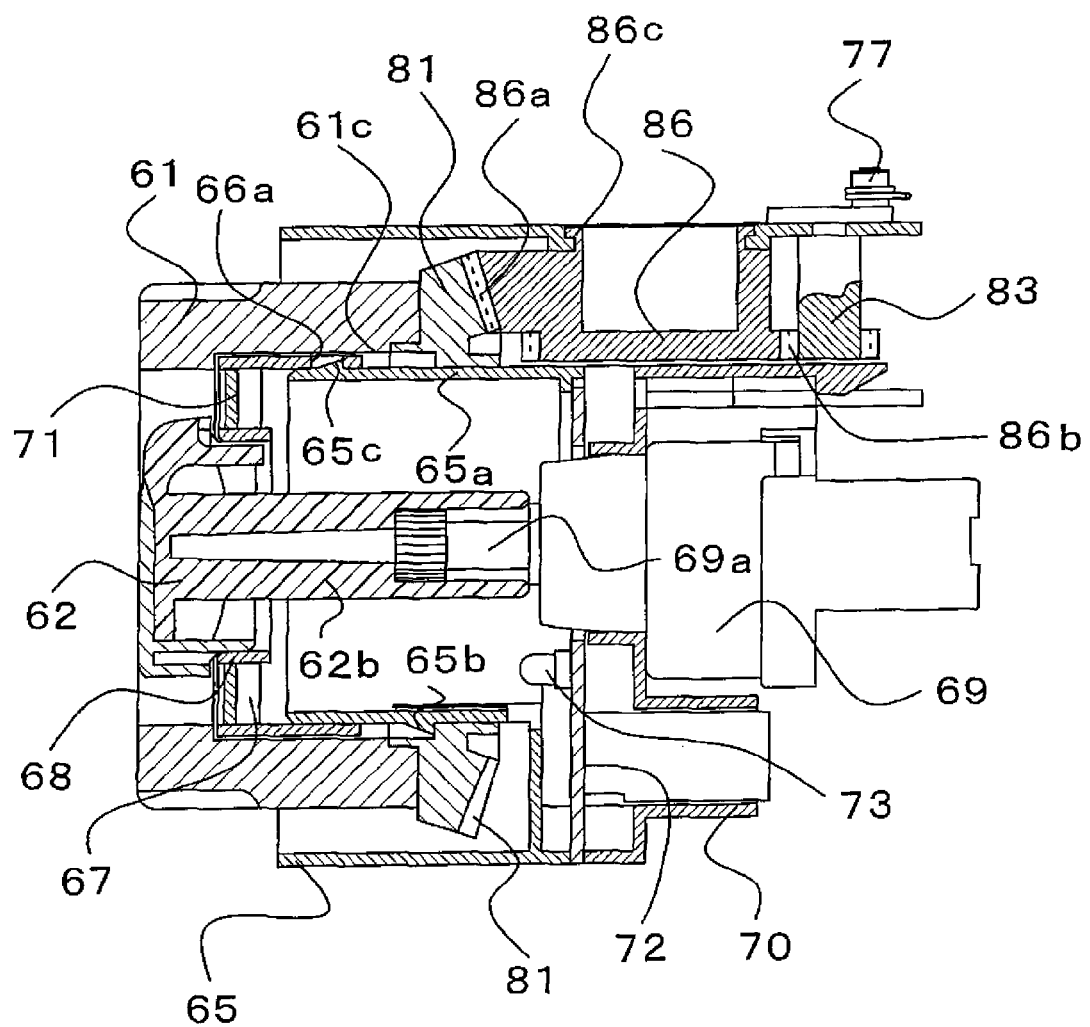
FIG. 8 is a sectional view showing the control device according to a third embodiment.
Figure 9:
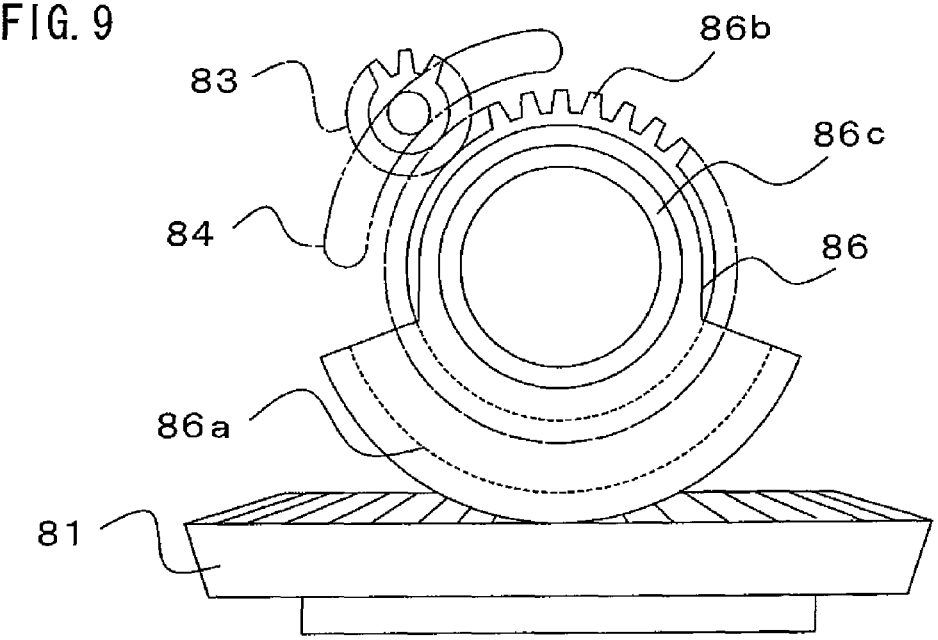
FIG. 9 is a diagram schematically illustrating an important part of the control device according to the third embodiment.
Figure 10:
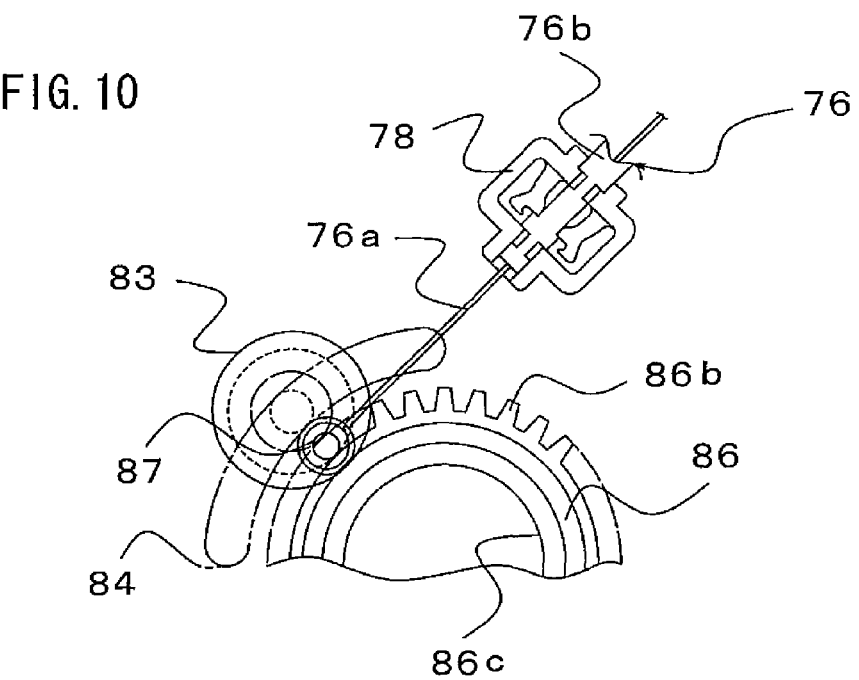
FIG. 10 is a diagram schematically illustrating a manner of connection of the control cable in the control device according to the third embodiment.

FIGS. 8, 9 and 10 illustrate a third embodiment wherein FIG. 8 is a sectional view of the control device, FIG. 9 is a diagram schematically illustrating an important part of the control device and FIG. 10 is a diagram schematically illustrating a manner in which the control cable is connected to the planet gear.

The present embodiment is similar to the second embodiment except that the sun gear 82 in the second embodiment is replaced by a sun gear 86 including a sectoral bevel gear 86*a*.

More in details, the sun gear 86 in this embodiment comprises the bevel gear 86*a*, the spur gear 86*b* engaged with the planet gear 83. The sun gear 86 has a ring-shaped gear shaft 86*c* rotatably mounted on a part of the case 65.

According to this embodiment, the control knob 61 may be rotationally operated to control operation of the air conditioning unit via the interlocking gear 81, the sun gear 86, the planet gear 83 and the control cable 76 in the same manner as in the control device according to the second embodiment.

Figure 11:
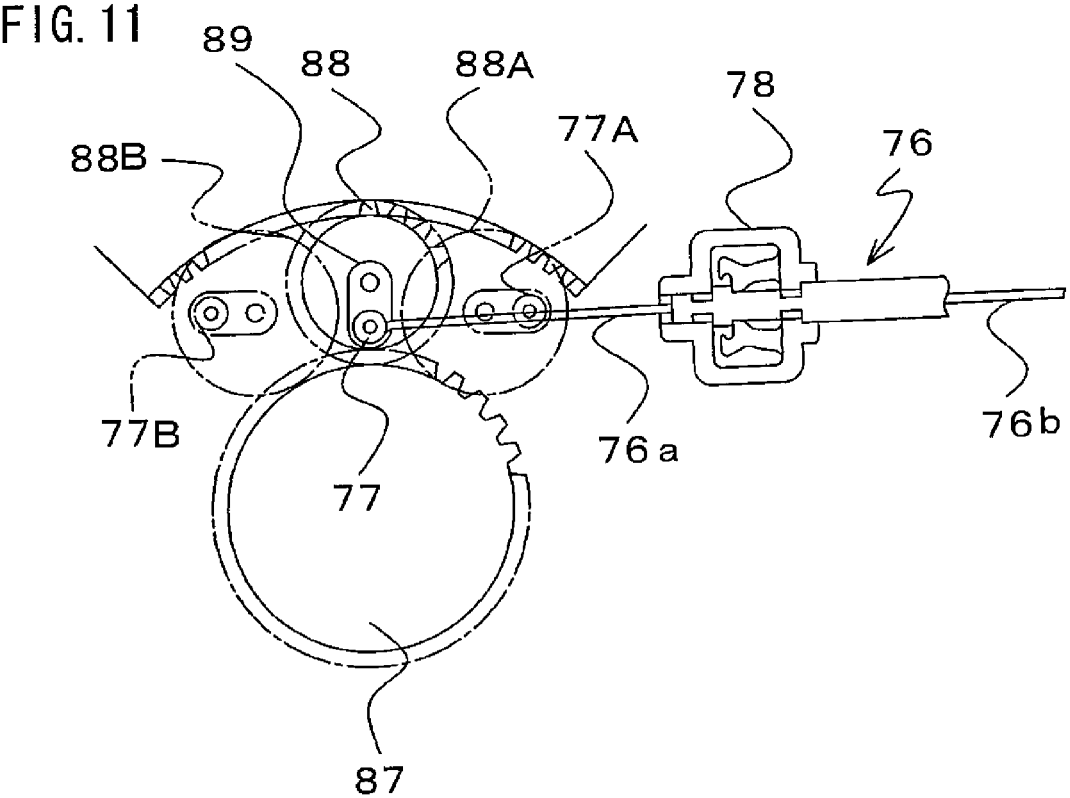
FIG. 11 is a diagram schematically illustrating an important part of the control device according to a fourth embodiment.

FIG. 11 is a schematic diagram similar to FIGS. 3, 7 and 10, illustrating an important part of the control device according to a fourth embodiment.

The present embodiment is characterized in that the planet gear 88 interlocking with the sun gear 87 is provided with a pivoting member 89.

Specifically, the pivoting member 89 has one end fixed to a central portion of the planet gear 88 and the other end provided with the connector member 77 for the control cable 76. In addition, the clamp member 78 is provided on the extension of the line connecting the one end 77A to the other end 77B of e rotary locus described by the connector member 77.

In the present embodiment characterized in that the planet gear 88 is provided with the pivoting member 89, a length of the pivoting member 89 may be selectively adjusted.

The connector member 77 is mounted on the pivoting member 89 preferably at an eccentric position spaced from the center of the planet gear 88 so that the movement locus described by the connector member 77 may come close to the sun gear 87, as will be apparent from FIG. 11.

Such design allows the clamp member 78 to be located closer to the sun gear 87 and thereby allows the case 75 to be downsized.

Referring to FIG. 11, reference numerals 88A, 88B designates a pair of opposed positions to which the planet gear 88 can be moved.

It will be easily appreciated by those skilled in the art that the planet gear 64 in the first embodiment as well as the planet gear 83 in the second and third embodiments can be also provided with the pivoting member 89.

While the first to fourth embodiments have been described hereinabove, these embodiments may be respectively modified or varied without departing from the scope of the invention. For example, the circular arc-shaped internal gear 75 may be replaced by a ring-like gear. The switch adapted to be turned on or off by the control knob 62 may be replaced by a plurality of individual switches or contacts arranged on the circuit substrate so as to be switched by the control knob. Furthermore, the switches provided within the control knob 61 may be implemented in the form of a push switch or rotary switch.

In the control device as has been described hereinabove, the gear assembly comprises the sun gear, the planet gear and the internal gear or comprises the interlocking gear, the sun gear, the planet gear and the internal gear. Such set of the gears is suitable for downsizing of the gear assembly so as to be housed within the case.

Consequentially, the control knobs can be made in a common configuration and therefore it is possible to provide the dial control device comprising a plurality of control units having different functions selectively combined depending on the type of motor vehicle.

For example, TEMP knob unit, MODE knob unit, FAN knob unit and the other knob unit may be individually constructed, thereafter these units may be combined according to a particular design and installed.

Now the control device for air conditioning unit of a motor vehicle according to a fifth embodiment will be described in reference with the accompanying drawings.

Figure 12:
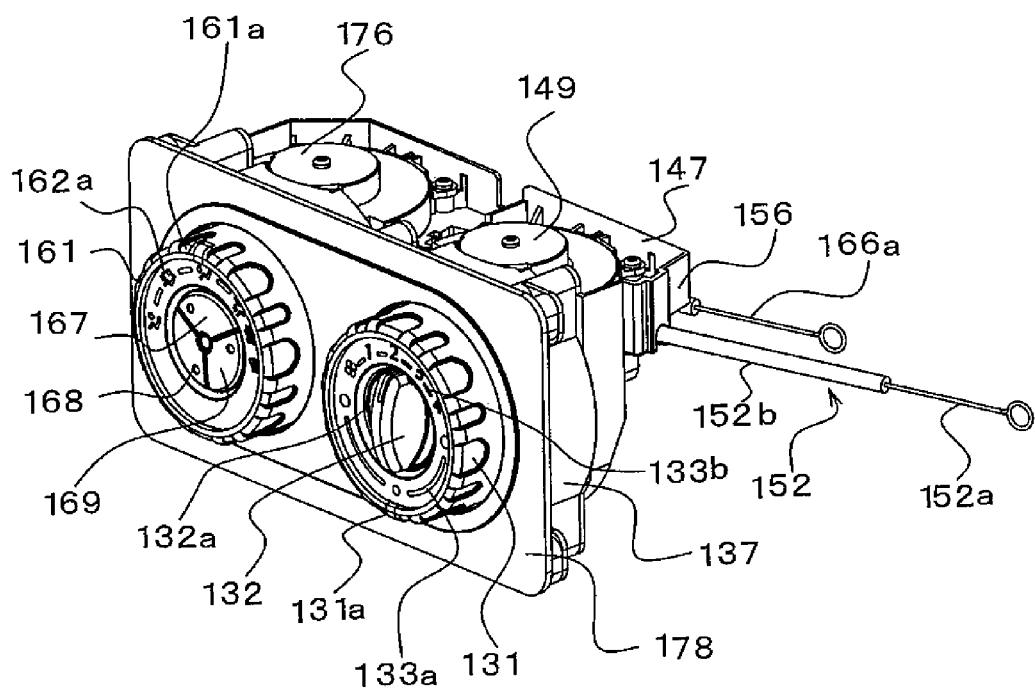
FIG. 12 is a perspective view showing the control device for air conditioning unit of a motor vehicle according to a fifth embodiment of duplex control knob fashion.
Figure 13:
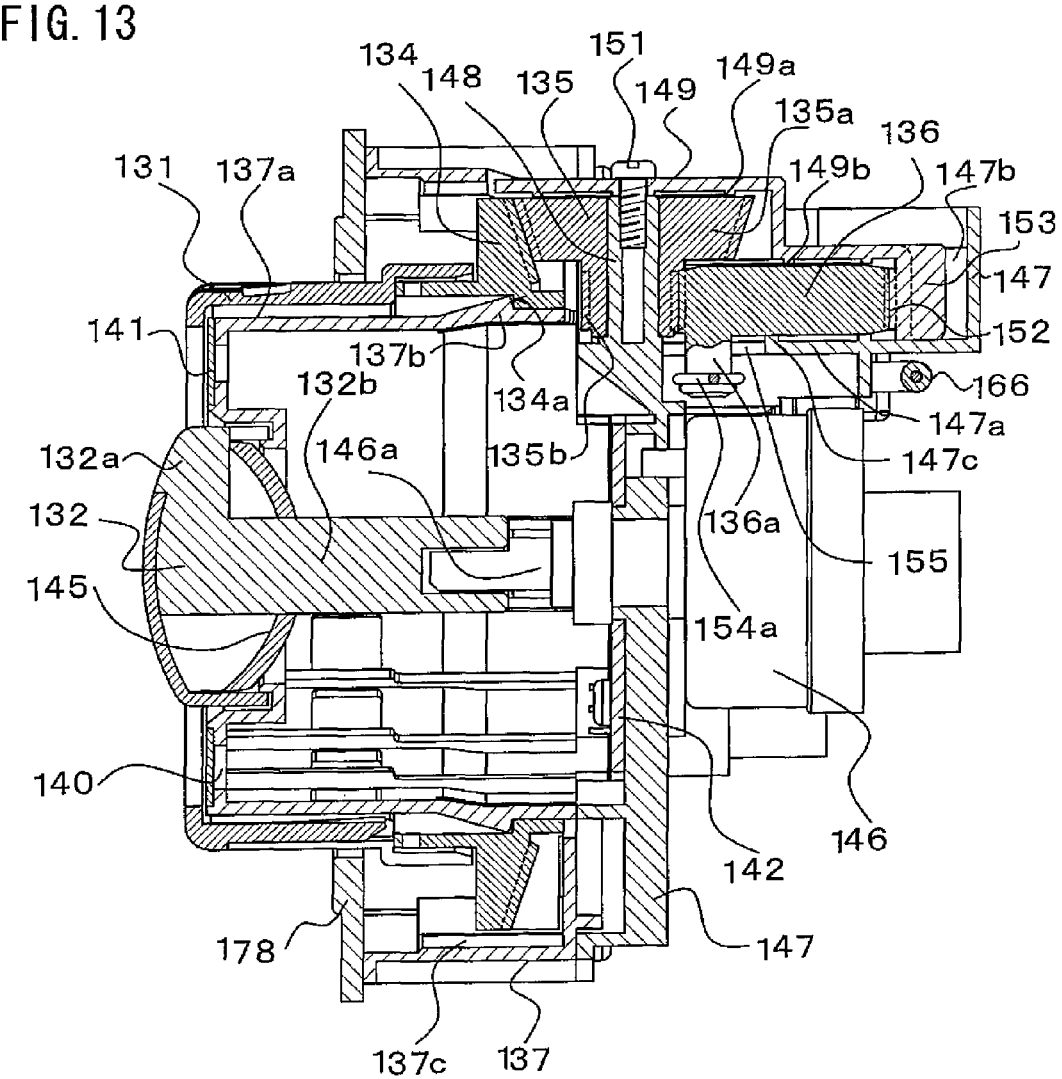
FIG. 13 is a sectional view showing the control device according to the fifth embodiment taken in one of the control knobs.
Figure 14:
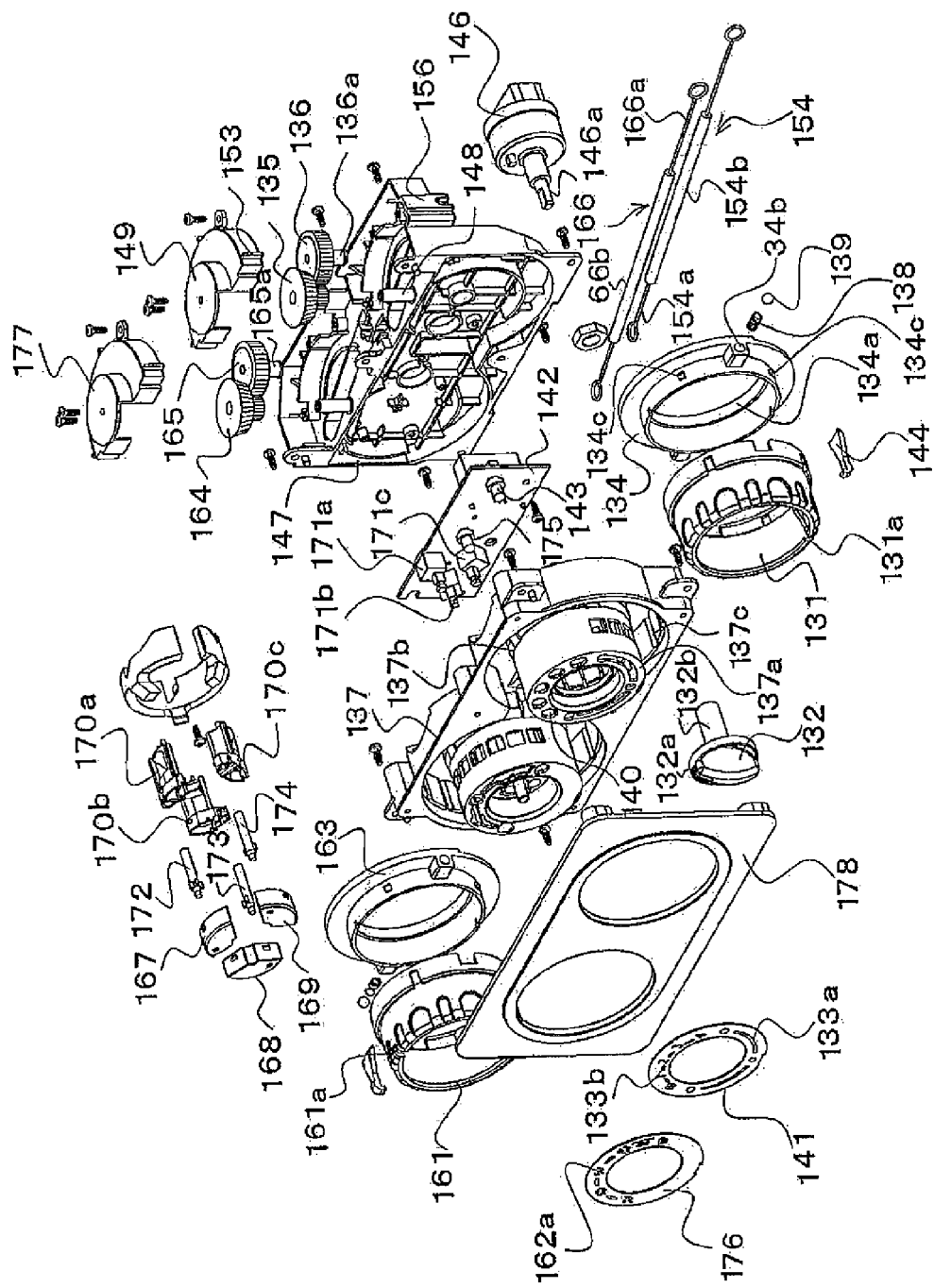
FIG. 14 is an exploded perspective view showing the control device according to the fifth embodiment.

FIG. 12 is a perspective view showing the control device of duplex control knob fashion, FIG. 13 is a sectional view showing the control device taken in one of the control knobs and FIG. 14 is an exploded perspective view showing this control device.

First of all, a control knob 131 and an interlocking mechanism thereof will be described.

The control knob 131 is a dial knob for temperature regulation and this control knob 131 contains within a cylindrical portion thereof a control knob 132 in the form of a finger-grip protuberance serving as a dial knob for airflow regulation.

In operation, the control knob 131 may be rotated until an indicator 131a thereof is aligned with a desired symbol 133a to achieve selective temperature regulation.

Gripping the protuberance with the fingers, the control knob 132 may be rotated until an indicator 132a thereof is aligned with a desired symbol 133b to achieve selective airflow regulation.

As illustrated by FIGS. 13 and 14, the cylindrical control knob 131 integrally has, around its rear end, an interlocking gear 134 in the form of a bevel gear with which a sun gear 135 engages and thereby causes a planet gear 136 to revolve.

This control knob 131 is rotatably mounted on an outer periphery of a cylindrical portion 137a extending within a front base 137.

More specifically, the interlocking gear 134 integral with the control knob 131 is formed therein with a ring-shaped step 134a adapted to latch together with a projecting stopper 137b formed on said cylindrical portion 137a to prevent the control knob 131 from dropping off.

It should be noted that the projecting stopper 137b is formed at two or more locations on the outer periphery of the cylindrical portion 137a.

A circular flange of this interlocking gear 134 is provided at several locations of its outer periphery with projecting stoppers 134c adapted to engage with the associated grooves formed on an inner periphery of the control knob 131 to ensure that the interlocking gear 134 rotates integrally with the control knob 131.

Said interlocking gear 134 is provided with a click stop mechanism allowing a vehicle driver to experience an operational feel in the course of operating the control knob 131 to align the indicator 131a of the control knob 131 with a desired one of the symbols 133a.

Specifically, this click stop mechanism comprises, as shown by FIG. 14, small balls 139 inserted into small pits 134b formed on the interlocking gear 134 biased by springs 138 to move inward in radial direction and operational feel giving grooves 137c formed on the front base 137.

Said cylindrical portion 137a integrally includes a front plate formed with a plurality of through-holes 140 arranged along a circumference thereof serving to illuminate said symbols 133a, 133b.

A displaying plate 141 is fixed to said front plate so as to close said through-holes 140.

This displaying plate 141 is translucent at its regions covering the symbols 133a, 133b and non-translucent at the remaining region so that the symbols 133a, 133b may be optically displayed by energizing a lamp 143 mounted on a wiring substrate 142.

A light guiding member 144 (See FIG. 14) is attached to the control knob 131 in order that the indicator 131a is optically displayed by a light source such as LED mounted on the wiring substrate 142 and a light guiding member 145 is attached to the control knob 132 in order that the indicator 132a is optically displayed by the light source such as LED mounted on the wiring substrate 142.

The control knob 132 is rotatably inserted into the opening formed in the central cavity of said front plate.

An operating shaft 146a of an airflow regulating switch 146 is fitted into a knob shaft 132b of this control knob 132.

Said wiring substrate 142 and the airflow regulating switch 146 are provided within the rear case 147.

The sun gear 135 adapted to engage with the interlocking gear 134 mounted on the control knob 131 integrally includes a bevel gear 135a and s spur gear 135b having a diameter smaller than that of the bevel gear 135a wherein the sun gear 135 with the spur gear 135b lying on the downside is rotatably supported around a shaft 148 vertically standing from the rear base 147.

The planet gear 136 in the form of a spur gear engages with the spur gear 135b of the sun gear 135.

Specifically, the planet gear 136 revolves by interlocking with the sun gear 135 and moves on a planar portion 147a forming a part of the rear base 147, as shown by FIG. 13.

As will be also apparent from FIG. 13, the planar portion 147a is eccentrically located with respect to a rotation center of the control knob 132.

In this way, a central space is assured behind the control device and this space is available dispose various electric switches such as a fan switch 146.

Said space is available not only to dispose the electric switches but also to dispose various mechanical parts such as gears and levers used to manipulate the control cable.

In addition, it is also possible to assure a relatively large space to dispose the wiring substrate 142 and therefore the wiring substrate 142 can be provided with correspondingly much more number of electronic parts to improve the functionality of the wiring substrate 142.

The planar portion 147a is provided with a projection 147c with which the lower surface of the planet gear 136 moves in slidable contact and thereby a sliding resistance is alleviated.

According to the present embodiment, a gear case 149 fixed by screws to the rear base 147.

Figure 15:
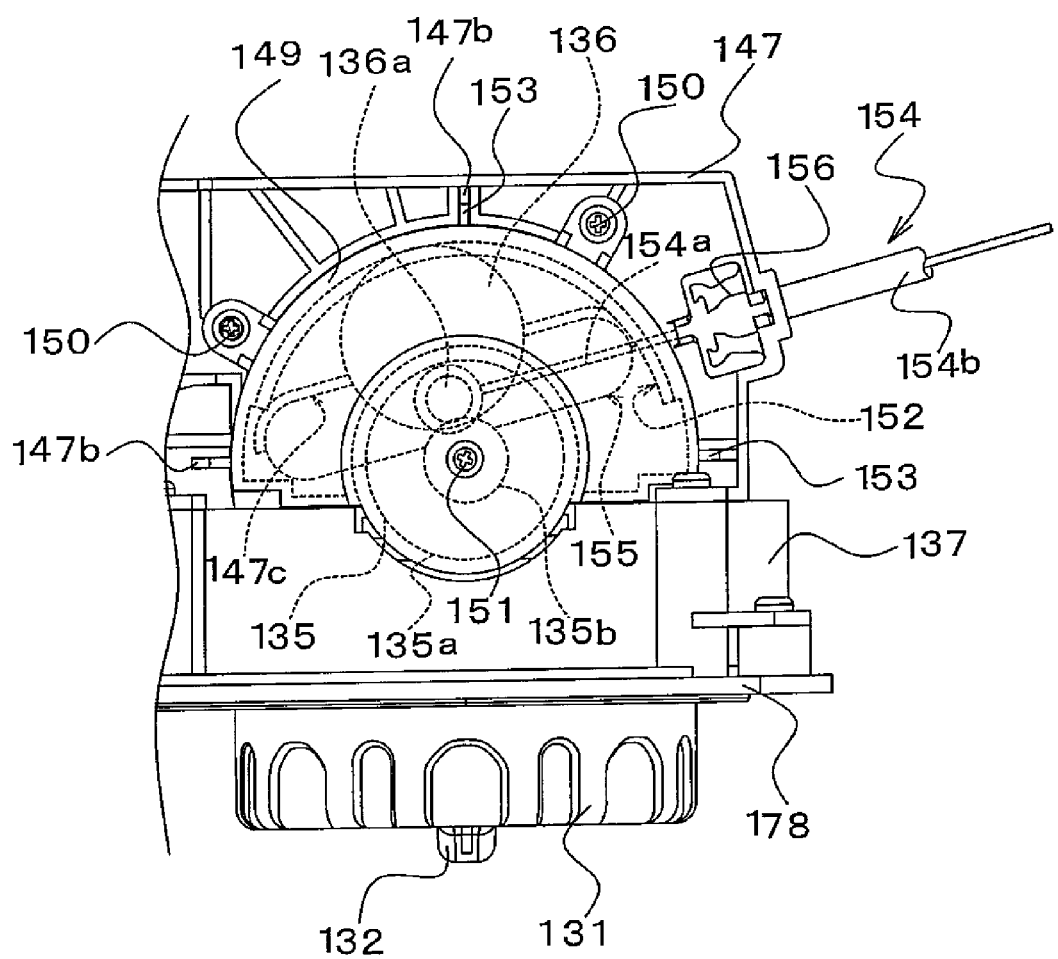
FIG. 15 is a partial plan view showing the control device according to the fifth embodiment.

Specifically, the gear case 149 is fixed along its periphery to the rear base 147 by means of the screws 150 as will be seen in FIG. 15 and provided at a central region with a screw 151 adapted to be entwisted into the shaft 148 to prevent the sun gear 149 and the planet gear 136 from dropping off.

An upper wall of the gear case 149 is provided with an inner rib 149a adapted to come in contact with the sun gear 135 and a bottom wall is provided with an inner rib 149b adapted to come in contact with the planet gear 136.

Said gear case 149 is further provided with an internal gear 152 adapted to cooperate with the sun gear 135 to guide the movement of the planet gear 136.

Figure 17:
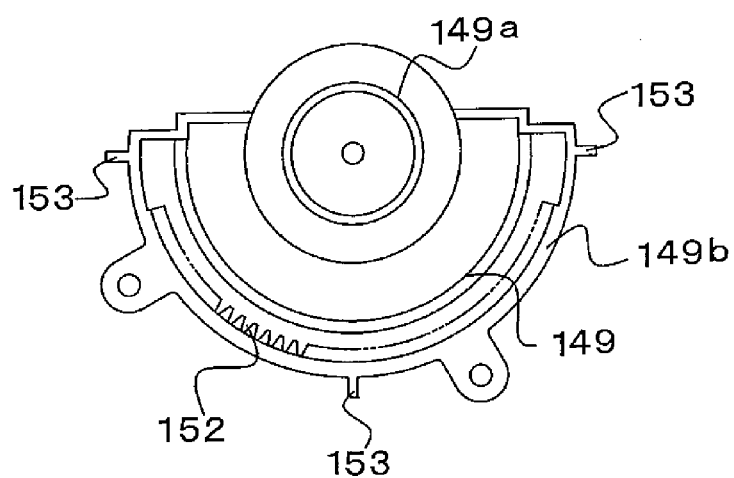
FIG. 17 is a rear view showing the gear case of the control device according to the fifth embodiment.

As FIG. 17 illustrates in an enlarged scale, the gear case 149 is provided with the circular arc-shaped internal gear 152 so that the planet gear 136 is rotated and moved by the driving force from the sun gear 135 between this internal gear 152 and the sun gear 135.

FIG. 17 is a rear view of the gear case 149.

Said gear case 149 includes along its periphery one or more tongue 153 so that this or these tongue(s) may be fitted into the associated positioning groove(s) 147b formed in the rear base 147 for positioning and then affixed to the rear base 147 by means of screws 150, 151.

Regarding the internal gear 152, instead of providing the internal gear 152 in the gear case 149, it may be provided in the form of a circular arc-shaped gear on the rear base to guide the planet gear 136 as properly as the internal gear 152 provided in the gear case 149.

Said planet gear 136 is provided with a projecting connector 136a to which the inner cable 154a of the control cable 154 is connected.

Figure 16:
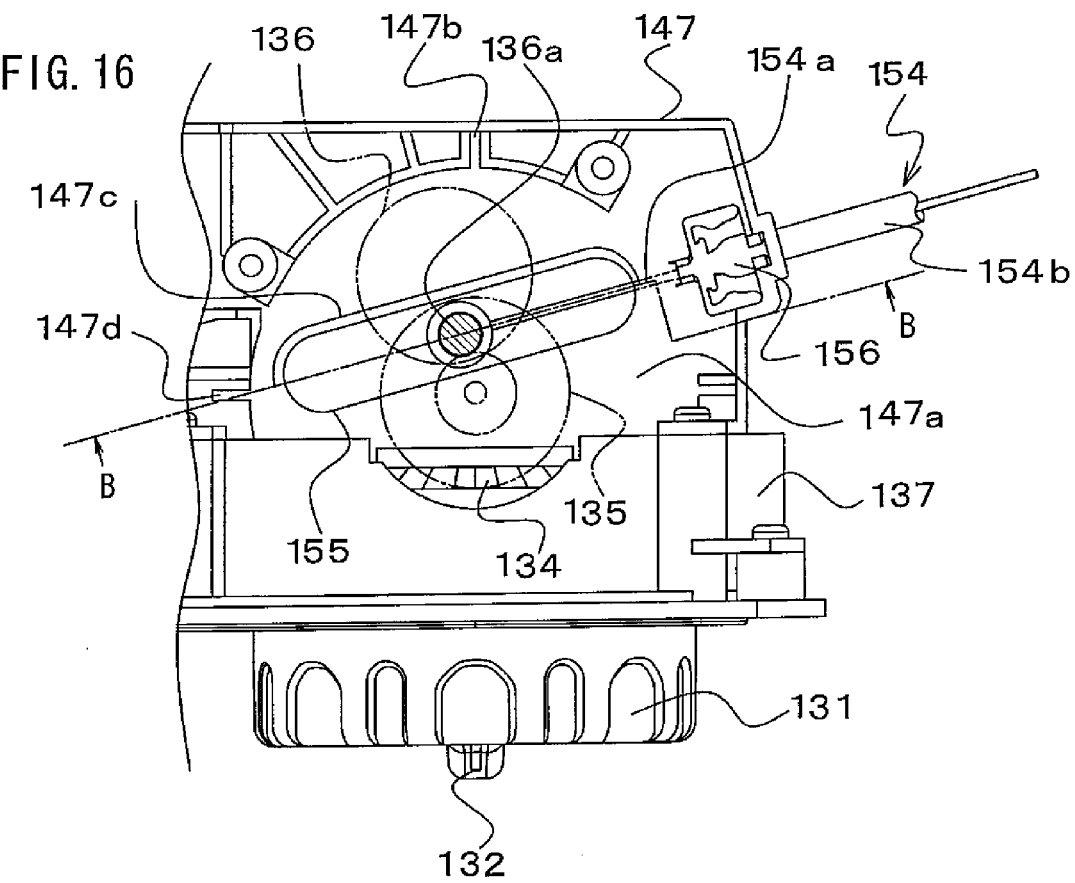
FIG. 16 is a partial plan view showing the control device according to the fifth embodiment as the gear case has been removed to reveal the inner structure.

As will be apparent from FIGS. 13, 15 and 16, the projecting connector 136a extends downward at an eccentric position with respect to the rotation center of the planet gear 136 through a notch 155 formed in the planar portion 147a of the rear base 147 to the rear side of the planar portion 147a.

FIG. 15 is a partial plan view showing an interlocking mechanism of the control knob 131 and FIG. 16 is a plan view showing the same interlocking mechanism but with the gear case 149 removed to reveal the inner construction.

The notch 155 in the planar portion 147a of the rear base 147 is provided in the form of a rectilinear slot having a length corresponding to a distance along which the projecting connector 136a can move as the control knob 131 is operated in its maximum rotational range.

Specifically, the sun gear 135 as well as the planet gear 136 may be appropriately designed and the projecting connector 136a may be located eccentrically with respect to the planet gear 136 to ensure that the projecting connector 136a moves substantially along a rectilinear path as the planet gear 136 moves around the sun gear 135.

The notch 155 is formed without any possibility that the notch 155 might interfere with the rear base 147 in a range within which the projecting connector 136a of the planet gear 136 moves.

In consequence, the projecting connector 136a can smoothly move within the notch 155 as the control knob 131 is rotated.

The control cable 154 comprises an outer cable 154b and an inner cable 154a slidably contained within this outer cable wherein one end of the inner cable 154a is connected to the projecting connector 136a projecting outward through the notch 155.

Figure 18:
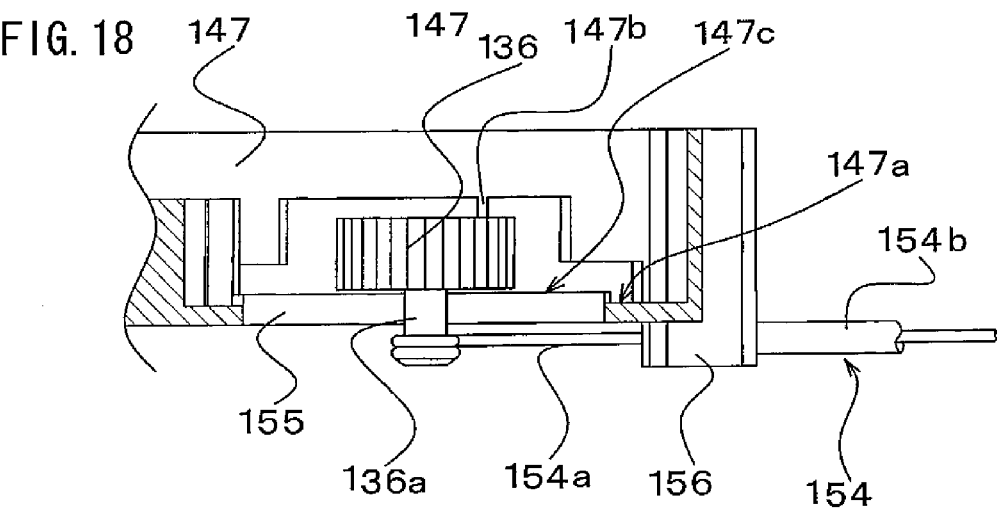
FIG. 18 is a partial sectional view showing a manner of connection between the boss of the planet gear and the inner cable of the control cable in the control device according to the fifth embodiment.
Figure 19:
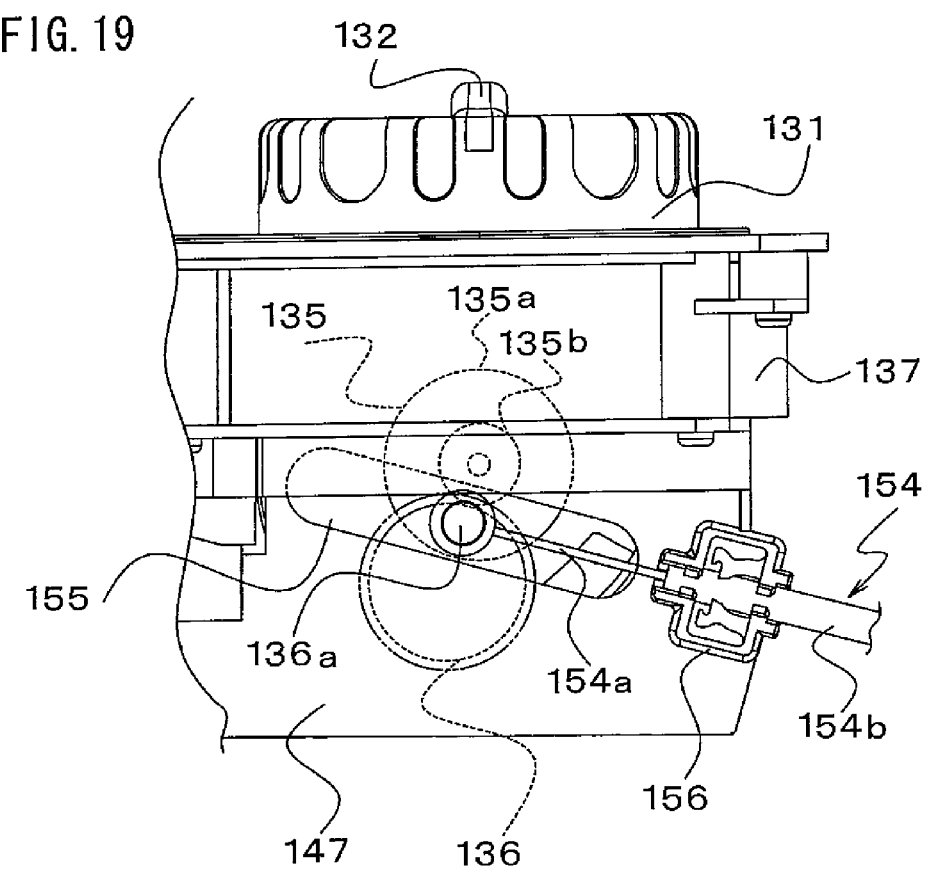
FIG. 19 is a partial bottom view of the control device according to the fifth embodiment, showing layout of the control cable.

In this way, as shown by FIGS. 18 and 19, the inner cable 154a can be connected to the projecting connector 136a on the rear side of the planar portion 147a of the rear base 147 and the control cable 154 can be disposed on the rear side of the rear base 147.

More specifically, one end of the outer cable 154b is held by a cable holder (i.e., clamp member) 156 mounted on the rear side of the rear base 147 (i.e., on the rear side of the planar portion 147a) and thereby the control cable can be stably installed.

Consequentially, the space in which the projecting connector 136a of the planet gear 136 moves can be commonly available with the space used to install the control cable 154, allowing a vertical dimension of the device to be downsized.

The cable holder 156 may be located on the extension of the substantially rectilinear motion locus of the projecting connector 136a to ensure that a flexural stress exerted on the control cable 154 is alleviated and a functionality of the control knob 131 is improved.

FIG. 18 is a sectional view taken along a line B-B in FIG. 16 and FIG. 19 is a bottom view showing the interlocking mechanism of the control knob 131.

In operation of the control device as has been described above, the control knob 131 is rotated until the indicator 131a thereof is aligned with the desired symbol 133a whereupon the sun gear 135 engaging with the interlocking gear 134 rotates integrally with the control knob 131 around the shaft 148.

In consequence, the planet gear 136 engaging with the spur gear 136b of the sun gear 135 moves under the guiding effect of the sun gear 135 and the internal gear 152.

Specifically, the planet gear 136 revolves around the spur gear 135b of the sun gear 135 sequentially passing the positions (A) to (C) or (C) to (A) depending on the direction in which the control knob 131 is rotated and the projecting connector 136a moves within the notch 155 describing a substantially rectilinear locus.

In response to this, the inner cable 154a of the control cable 154 is advanced or retracted, causing the air conditioning unit to regulate the temperature.

Reference numerals L1 and L2 in FIG. 20 designate cable strokes.

In operation of the control knob 132, the finger-grip protuberance is held with the fingers and rotated until the indicator 132a thereof is aligned with the desired symbol 133b.

Thereupon the airflow regulating switch 146 is turned on and a fan motor for airflow regulation is controlled.

While the control knobs 131, 132 and the interlocking mechanism thereof have been described above, the other control knob is for wind direction regulation of which the interlocking mechanism is of construction similar to that for a control knob 161.

Namely, the control knob 161 is rotated until the indicator 161a thereof is aligned with the desired symbol 162a whereupon an interlocking gear 163, a sun gear 164 and a planet gear 165 engage one with another so that the projecting connector 165a on the planet gear 165 moves to advance or retract the inner cable 166a of a control cable 166.

In this way, the wind direction of the air conditioning unit is correspondingly changed over.

The control cable 166 comprises an outer cable 166b and an inner cable 166a slidably contained within the outer cable 166b.

Within the cylindrical control knob 161, push buttons 167, 168 and 169 are provided respectively associated with a rear defroster switch, an air conditioning switch and an indoor air circulation/outdoor air intake exchanging switch.

Upon depression of these push buttons 167, 168, 169, sliders 170a, 170b, 170c shown in FIG. 14 are moved to actuate push switches 171a, 171b, 171c mounted on the wiring substrate 14.

Reference numerals 172, 173, 174 in FIG. 14 designate light guiding members, reference numeral 175 designates a lamp for night lighting, reference numeral 176 designates a display plate for symbol 162a, and reference numeral 177 designates a gear case.

The front base 137 and the rear base 147 are fixed together by means of screws and a panel member 178 is fixed to a front surface of the front base 137 by means of screws.

As has previously been described, the control knob 132 for airflow regulation is installed inside the control knob 131 for temperature regulation while the push button 167 for the rear defroster switch, the push button 168 for the air conditioning switch and the push button 169 for indoor air circulation/outdoor air intake switch are disposed inside the control knob 161 for wind direction regulation. With such construction, it is possible to arrange the various switches necessary for air conditioning in a motor vehicle can be in a consolidated way within a pair of the cylindrical control knobs 131, 161 and thereby not only to downsize the control device but also to improve the functionality of the control device.

By arranging the air conditioning functions in such a consolidated way, the wiring substrate 142 can be concentrated and thereby miniaturized, allowing a production cost to be reduced.

The components other than the wiring substrate 142 such as a panel 178, the control knobs 131, 161, the front base 137, the rear base 147 and the gear cases 149, 177 can be made common to the two control knobs and this feature also leads to reduction of production cost.

While the preferred embodiment has been described above, the notch 155 formed in the planar portion 147a of the rear base 147 may replaced by a Square U-shaped groove.

Figure 21:
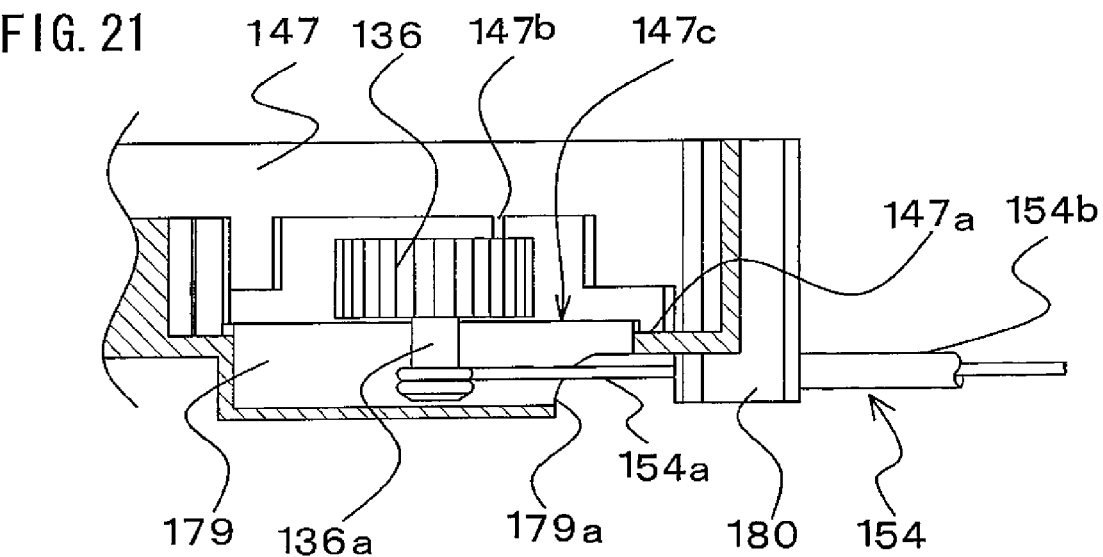
FIG. 21 is a sectional view similar to FIG. 18, showing a concave groove as a variant of the notched opening in the control device according to the fifth embodiment.

Specifically, the planar portion 147a of the rear base 147 may be formed with an elongate square U-shaped groove 179 having an opening 179a at one end, as shown by FIG. 21, so that the projecting connector 136a of the planet gear 136 may movably enter into this square U-shaped groove 179.

Figure 22:
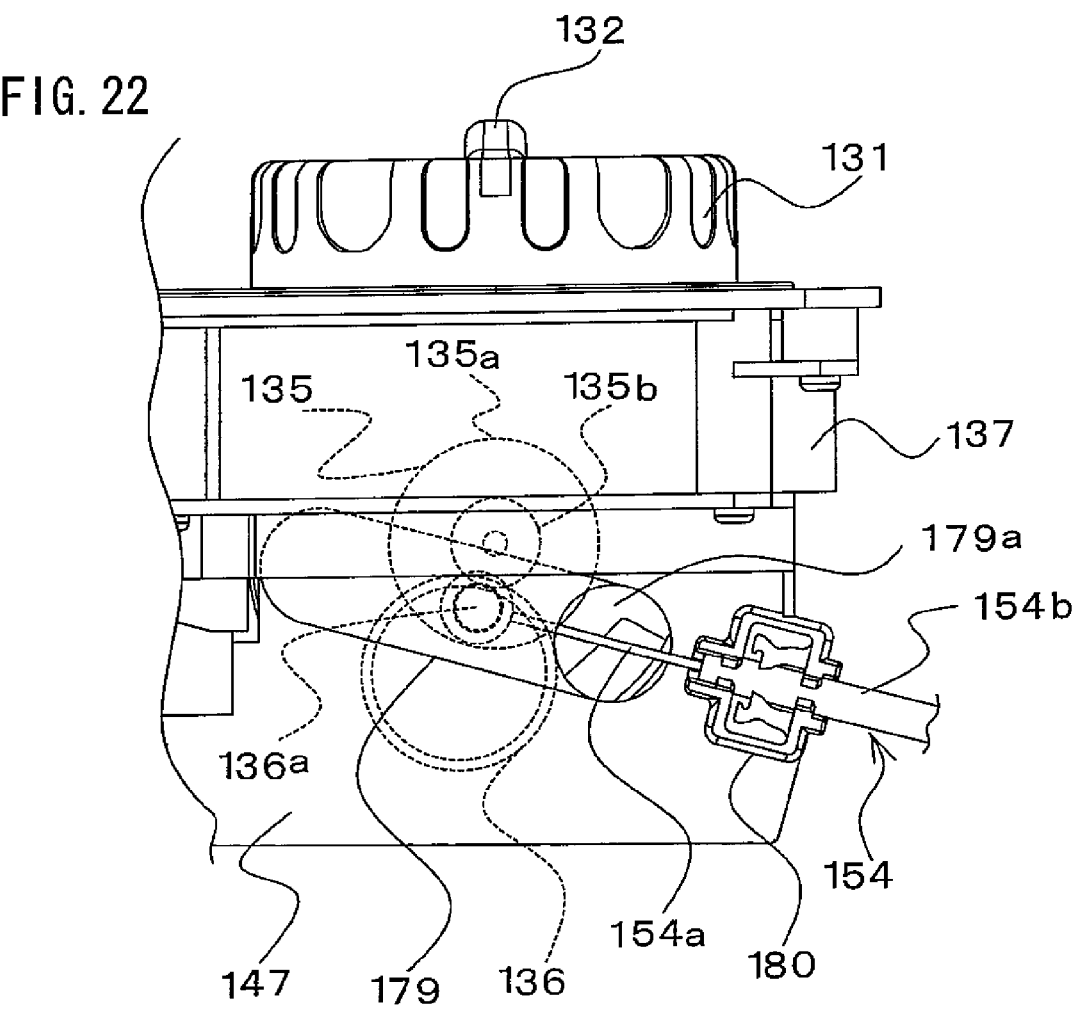
FIG. 22 is a partial bottom view showing the control device provided with said concave groove.

The inner cable 154a having one end connected to the projecting connector 136a may be pulled out from the opening 179a and, as shown by FIG. 22, the outer cable 154b containing therein the inner cable 154a is held by a cable holder (i.e., clamp member) 180 mounted on the rear side of the rear base 147.

While the fifth embodiment of the present invention has been described above, it is possible to implement this control device in the form of duplex type dial control device for air conditioning unit of a motor vehicle comprising a combined operating portion which, in turn, comprises the control knob serving as one of the cylindrical control knob 161 for wind direction regulation or the control knob 131 for temperature regulation and the control knob provided within this cylindrical control knob 132 for airflow regulation, on one hand, and a combined operating portion which comprises the other of said cylindrical two control knobs and the push button 167 for the rear defroster switch, the push button 168 for the air conditioning switch and the push button 169 for indoor air circulation/outdoor air intake exchanging switch all disposed with said other cylindrical control knob, on the other hand.

Now a sixth embodiment will be described in reference with FIGS. 23, 24 and 25.

The control device according to this embodiment is similar to the control device according to said fifth embodiment except that the push-button 167 for rear defroster switch, the push-button 168 for air conditioning and the push-button 169 for indoor air circulation/outdoor air intake exchanging switch disposed within said cylindrical control knob 161 are replaced by a control knob 181 having a finger-grip projection so that a control cable 182 may be controlled by rotating this control knob 181.

Figure 23:
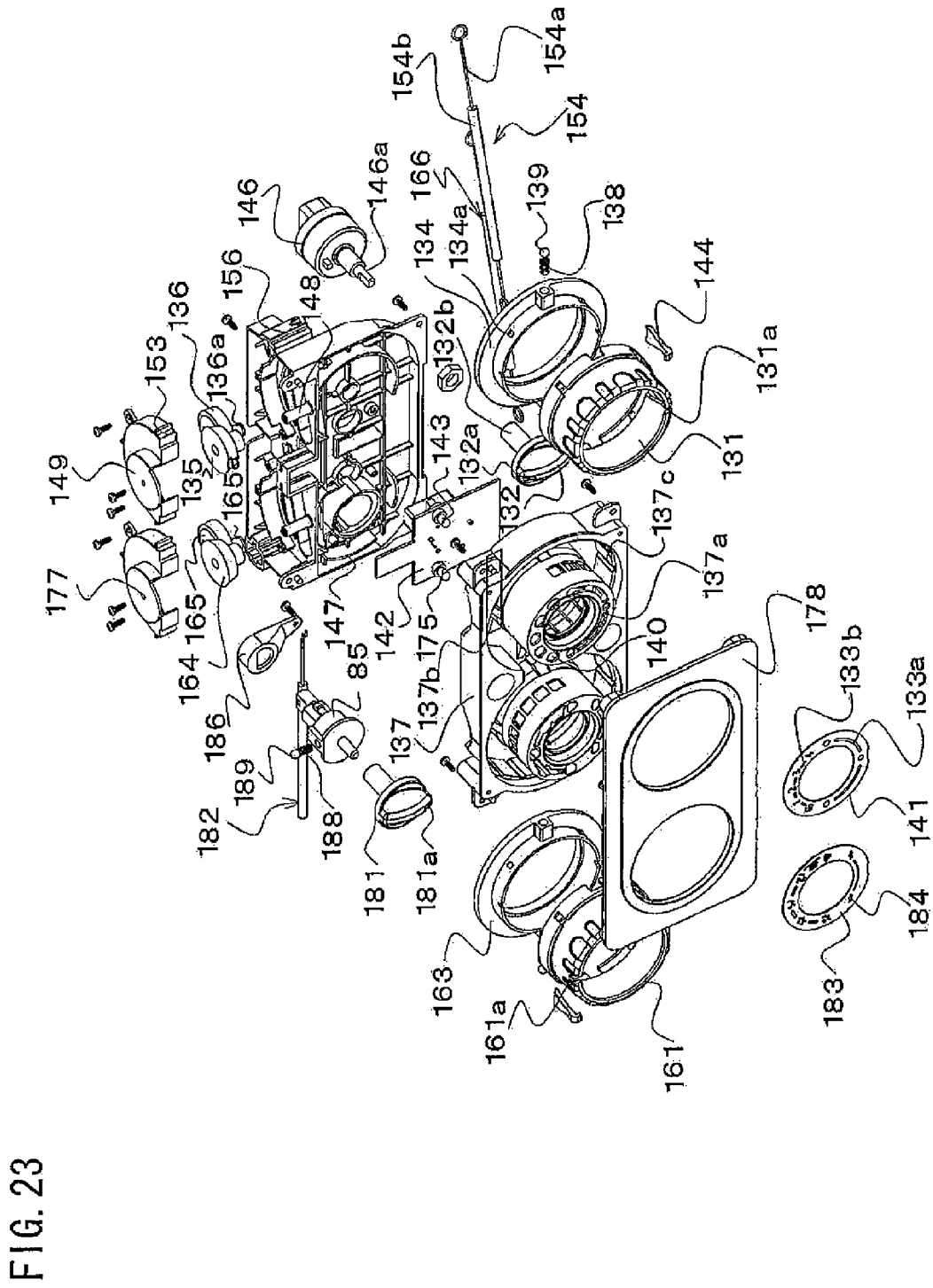
FIG. 23 is an exploded perspective view showing the control device according to a sixth embodiment.
Figure 24:
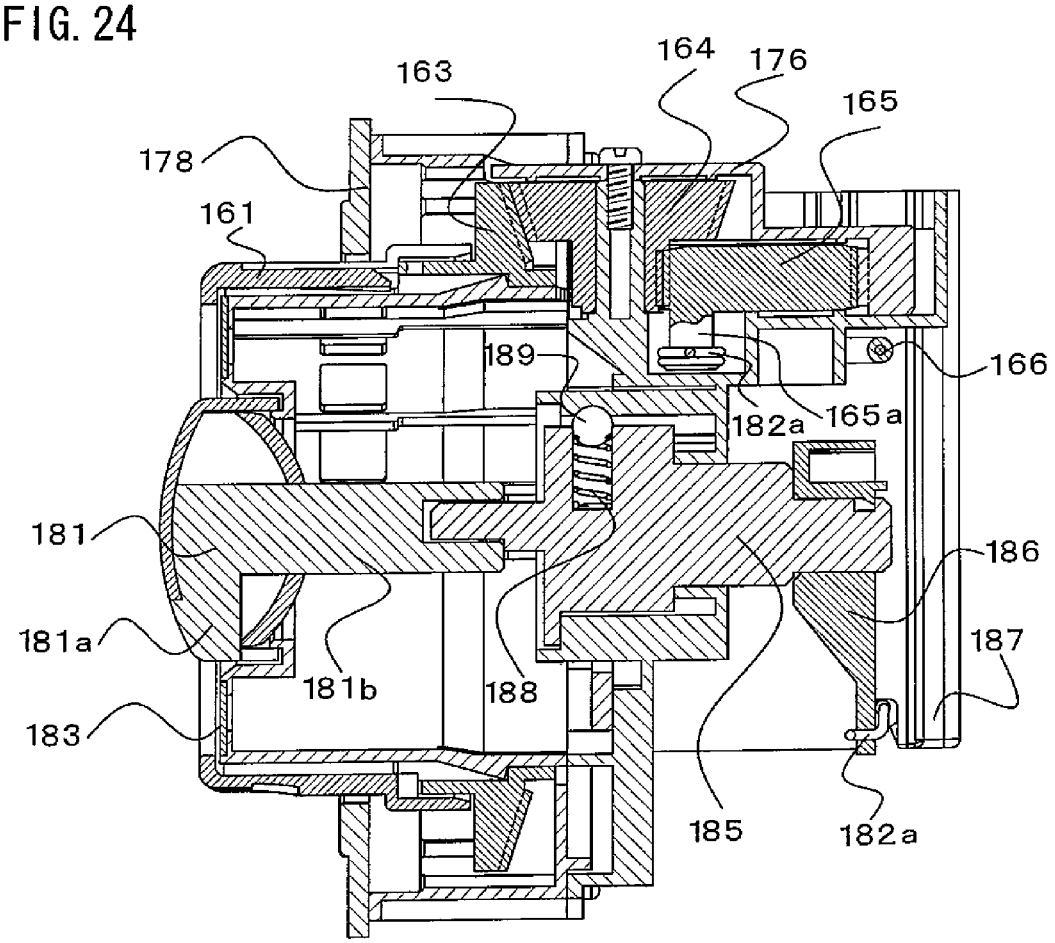
FIG. 24 is a sectional view showing an important part of the control device according to the sixth embodiment.
Figure 25:
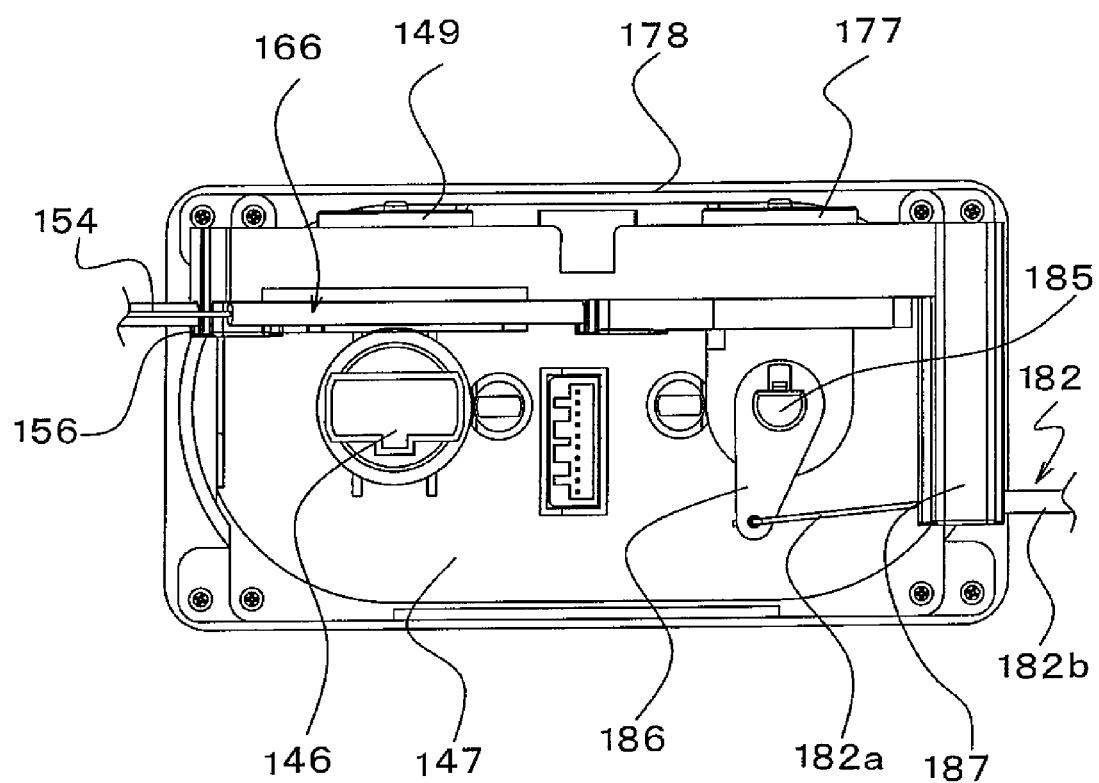
FIG. 25 is a rear view showing the control device according to the sixth embodiment.

FIG. 23 is an exploded perspective view similar to FIG. 14, showing the control device, FIG. 24 is a sectional view similar to FIG. 13, showing the interlocking mechanism for the control knob 161 and FIG. 25 is a rear view showing the control device according to the present embodiment.

As shown, a control knob 181 is movably disposed within the cylindrical control knob 161 and this control knob 181 may be rotated until its indicator 181a is aligned with a desired symbol 184 on a display plate 183 to control a control cable 182 and thereby to switch the mode of indoor air circulation/outdoor air intake.

This display plate 183 includes, in addition to said symbol 184, the symbol 162a with which the indicator 161a associated with the control knob 161 is to be aligned.

Specifically, a knob shaft 181b of the control knob 181 is coupled to a front end of a shaft 185 supported by the rear base 147 and an interlocking lever 186 is coupled to a rear end of this shaft 185 to control a control cable 182.

A inner cable 182a of the control cable 182 is connected to the interlocking lever 186 and an outer cable 182b is held by a cable holder (i.e, clamp member) 187 mounted behind the rear case 147.

As shown in FIG. 24, the shaft 185 is provided with a small ball 189 biased by a spring 188 to thrust forward while the rear case 147 is formed with a click groove adapted to receive the small ball 189 in order that an operator of the control knob 181 can experience an operational feel.

In the case of the control device according to the present embodiment, in response to rotational operation of the control knob 181, the inner cable 182a of the control cable 182 is advanced or retracted to exchange the mode of indoor air circulation/outdoor air intake.

In this way, the present invention can be implemented in the form of the control device comprising the cylindrical control knob 131, 161 containing therein a control knob serving to change over the electric switch and the other control operations via the control cable as an interlocking medium.

Now a sixth embodiment will be described in reference with FIGS. 23, 24 and 25.

The control device according to the present embodiment is similar to said fifth embodiment except that the push button 167 for rear defroster switch, the push button 168 for air conditioning and the push button 169 for indoor air circulation/outdoor air intake exchanging switch disposed within the cylindrical control knob 161 is replaced by a control knob 181 in the form of a projecting finger-grip so that the control cable 182 is controlled by rotating this control knob 181.

FIG. 23 is an exploded perspective view similar to FIG. 14, illustrating the control device according to this embodiment, FIG. 24 is a sectional view similar to FIG. 13, showing the interlocking mechanism of the control knob 161, and FIG. 25 is a rear view showing the control device according to the present embodiment.

As shown, the control knob 181 is movably disposed within the cylindrical control knob 151 so that this control knob may be rotated until an indicator 181a thereof is aligned with a desired symbol 184 to control the control cable 182 and thereby to exchange of the indoor air circulation/outdoor air intake.

The display plate 183 is provided with, in addition to the symbol 184, the symbol 162a with which the indicator 161a of the control knob 161 is to be aligned.

Specifically, a knob shaft 181b of the control knob 181 is coupled to a front end of a shaft supported on the rear base 147 and an interlocking lever 186 adapted to control the control cable 182 is coupled to a rear end of this shaft 185.

The inner cable 182a of the control cable 182 is coupled to the interlocking lever 186 and the outer cable 182b is held by a cable holder (i.e., clamp member) mounted behind the rear case 147.

As will be seen in FIG. 24, the shaft 185 is provided with small ball 189 normally biased by a spring 188 while the rear case 147 is formed with a click groove adapted to receive the small ball 189 so that the operator of the control knob 181 can experience an operational feel of the control knob 181.

The control device according to the present embodiment ensures that the inner cable 182a of the control cable 182 is advanced or retracted in response to rotational operation of the control knob 181 and thereby indoor air circulation/outdoor air intake mode is switched.

In this way, the present invention can be implemented in the form of the control device comprising the cylindrical control knob 131, 161 containing therein a control knob serving to change over the electric switch and the other control operations via the control cable as an interlocking medium.

A seventh embodiment in the form of the control device for air conditioning unit of a motor vehicle will be described in reference with the associated drawings.

First of all, a control knob 131 and an interlocking mechanism thereof will be described.

Figure 26:
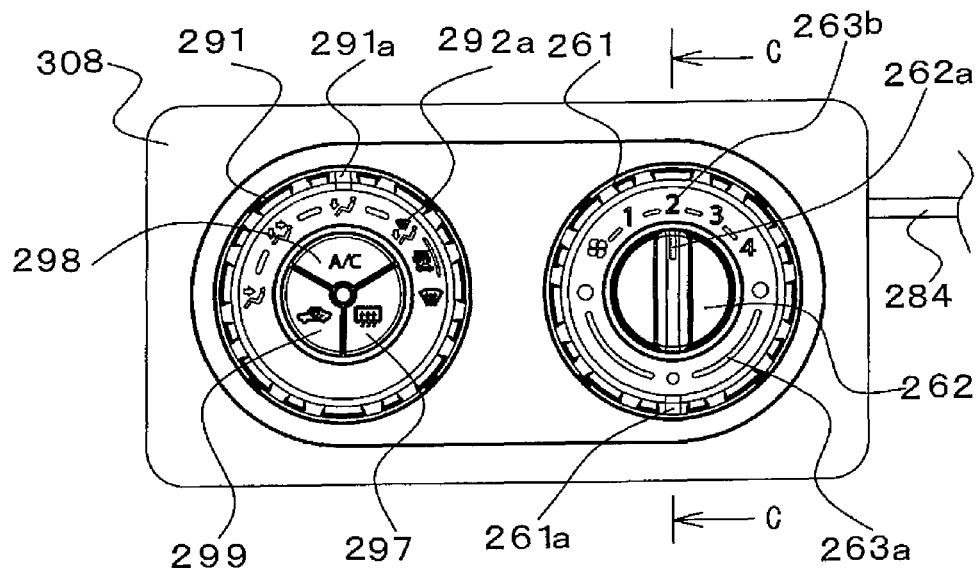
FIG. 26 is a front view showing the control device for air conditioning unit of a motor vehicle according to a seventh embodiment.
Figure 27:
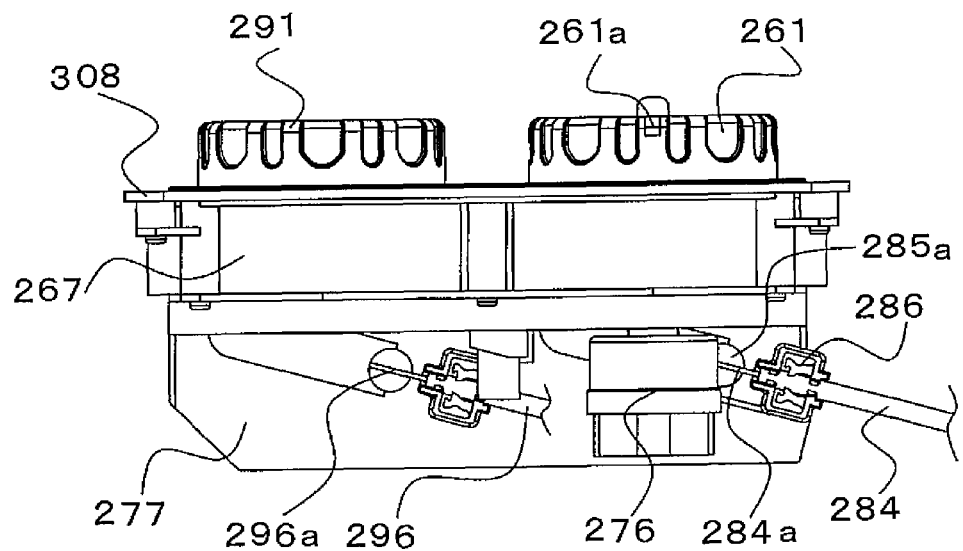
FIG. 27 is a bottom view showing the control device according to the seventh embodiment.
Figure 28:
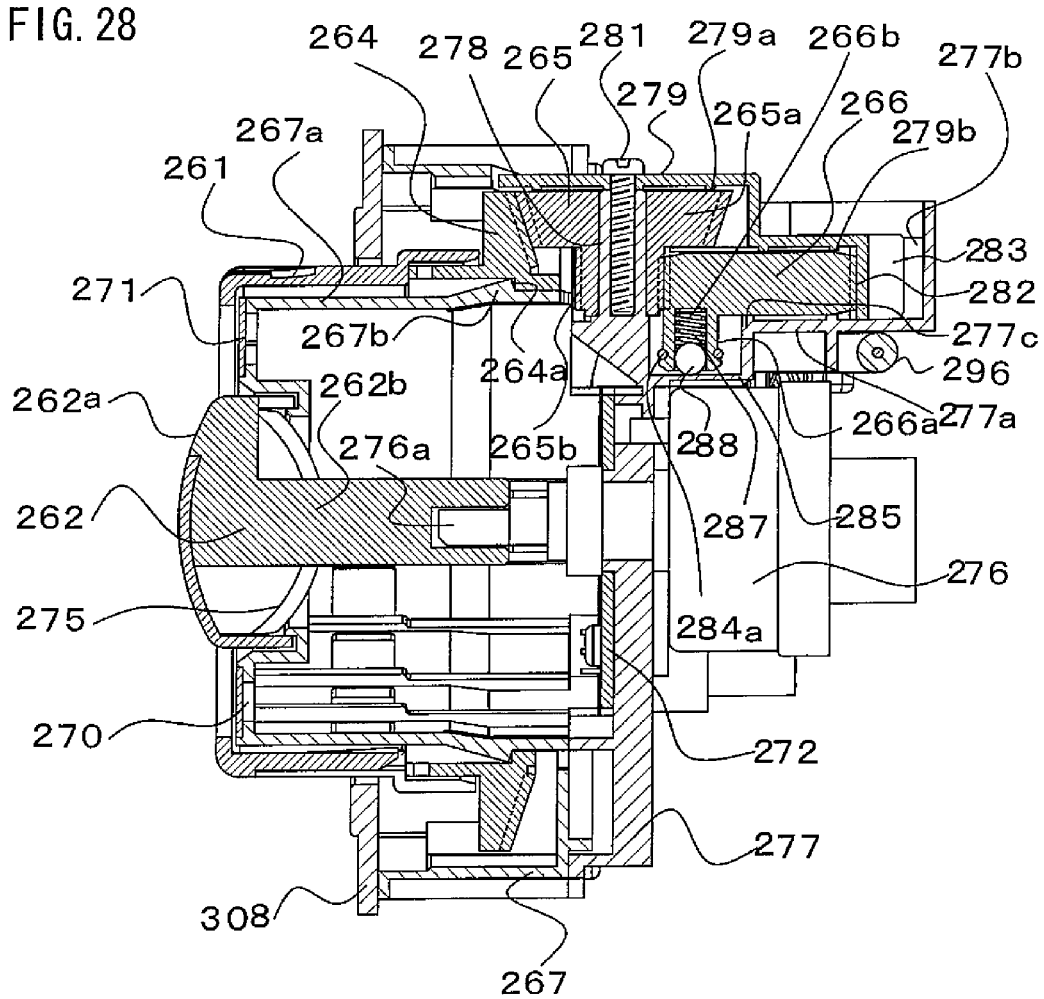
FIG. 28 is a sectional view taken along a line B-B in FIG. 26.
Figure 29:
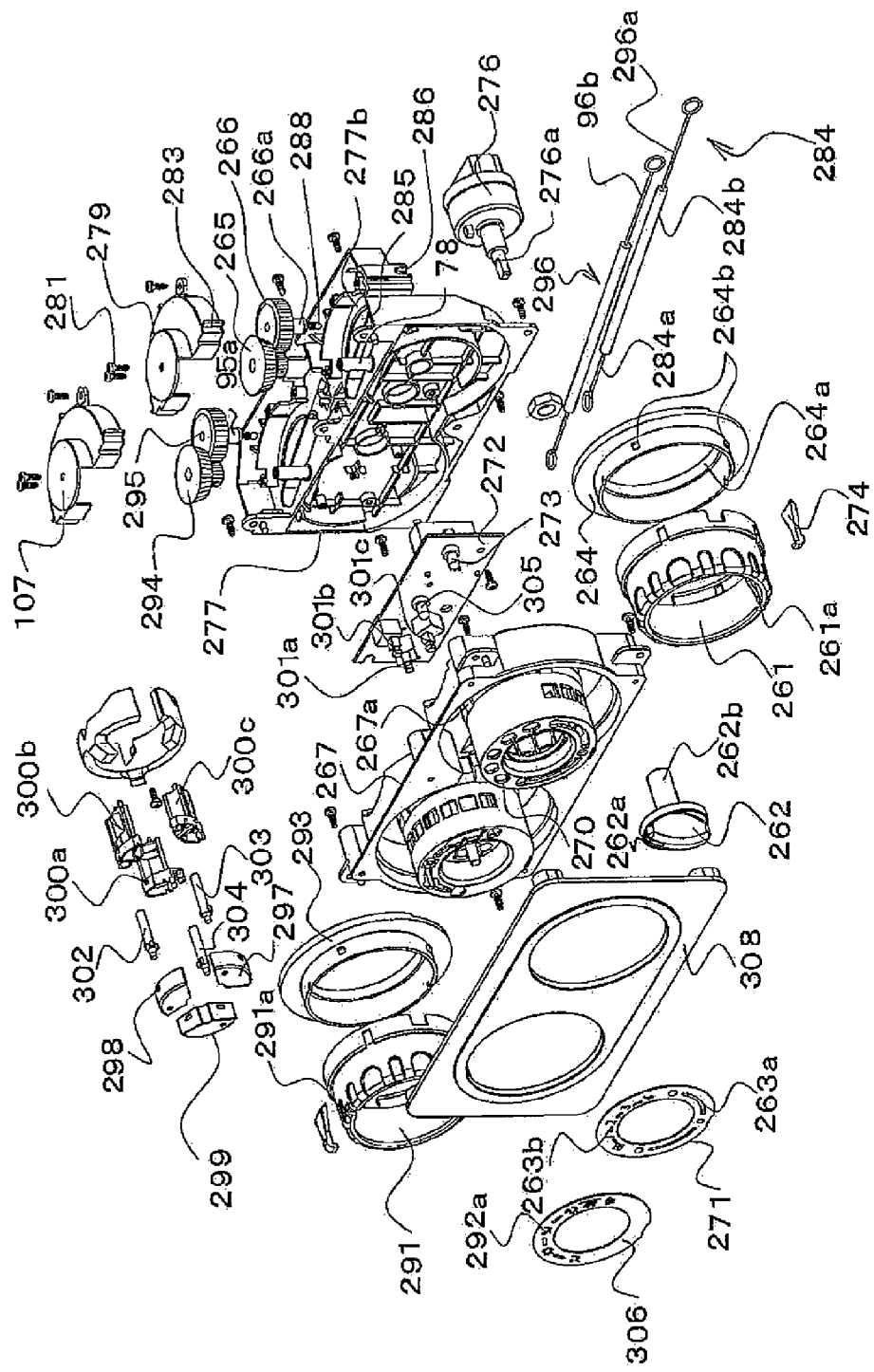
FIG. 29 is an exploded perspective view showing the control device according to the seventh embodiment.

FIG. 26 is a front view showing the control device of duplex control knob fashion, FIG. 27 is a bottom view showing this control device, FIG. 28 is a sectional view taken along a line C-C in FIG. 28, and FIG. 29 is an exploded perspective view of this control device.

First of all, a control knob 261 and an interlocking mechanism thereof will be described.

The control knob 261 is a dial knob for temperature regulation and this control knob 261 contains within a cylindrical portion thereof a control knob 262 in the form of a finger-grip protuberance serving as a dial knob for airflow regulation.

In operation, the control knob 261 may be rotated until an indicator 261a thereof is aligned with a desired symbol 263a to achieve selective temperature regulation.

Gripping the protuberance with the fingers, the control knob 262 may be rotated until an indicator 262a thereof is aligned with a desired symbol 263b to achieve selective airflow regulation.

As illustrated by FIGS. 28 and 29, the cylindrical control knob 261 integrally has, around its rear end, an interlocking gear 264 in the form of a bevel gear with which a sun gear 265 engages and thereby causes a planet gear 266 to revolve.

This control knob 261 is rotatably mounted on an outer periphery of a cylindrical portion 267a extending within a front base 267.

More specifically, the interlocking gear 264 integral with the control knob 261 is formed therein with a ring-shaped step 264a adapted to latch together with a projecting stopper 267b formed on said cylindrical portion 267a to prevent the control knob 261 from dropping off.

It should be noted that the projecting stopper 267b is formed at two or more locations on the outer periphery of the cylindrical portion 267a.

A circular flange of this interlocking gear 264 is provided at several locations of its outer periphery with projecting stoppers 264b adapted to engage with the associated grooves formed on an inner periphery of the control knob 261 to ensure that the interlocking gear 264 rotates integrally with the control knob 261.

Said cylindrical portion 267a integrally includes a front plate formed with a plurality of through-holes 270 arranged along a circumference thereof serving to illuminate said symbols 263a, 263b.

A displaying plate 271 is fixed to said front plate so as to close said through-holes 270.

This displaying plate 271 is translucent at its regions covering the symbols 263a, 263b and non-translucent at the remaining region so that the symbols 263a, 263b may be optically displayed by energizing a lamp 273 mounted on a wiring substrate 272.

A light guiding member 274 (See FIG. 29) is attached to the control knob 261 in order that the indicator 261a is optically displayed by a light source such as LED mounted on the wiring substrate 272 and a light guiding member 275 is attached to the control knob 262 in order that the indicator 262a is optically displayed by the light source such as LED mounted on the wiring substrate 272.

The control knob 262 is rotatably inserted into the opening formed in the central cavity of said front plate.

An operating shaft 276a of an airflow regulating switch 276 is fitted into a knob shaft 262b of this control knob 262.

Said wiring substrate 272 and the airflow regulating switch 276 are disposed within the rear case 277.

The sun gear 265 adapted to engage with the interlocking gear 264 mounted on the control knob 261 integrally includes a bevel gear 265a and s spur gear 265b having a diameter smaller than that of the bevel gear 265a wherein the sun gear 265 with the spur gear 265b lying on the downside is rotatably supported around a shaft 278 vertically standing from the rear base 277.

The planet gear 266 in the form of a spur gear engages with the spur gear 265b of the sun gear 265.

Specifically, the planet gear 266 revolves by interlocking with the sun gear 265 and moves on a planar portion 277a forming a part of the rear base 277, as shown by FIG. 28.

As will be also apparent from FIG. 28, the planar portion 277a is eccentrically located with respect to a rotation center of the control knob 261, 262.

In this way, a central space is assured behind the control device and this space is available dispose various electric switches such as the airflow regulating 276.

In addition, it is also possible to assure a relatively large space to dispose the wiring substrate 272 and therefore the wiring substrate 272 can be provided with correspondingly much more number of electronic parts to improve the functionality of the wiring substrate 272.

The planar portion 277a is provided with a projection 277c with which the lower surface of the planet gear 266 moves in slidable contact and thereby a sliding resistance is alleviated.

According to the present embodiment, a gear case 279 fixed by screws to the rear base 277.

Specifically, the gear case 279 is fixed along its periphery to the rear base 277 by means of the screws 280 as will be seen in FIG. 5 and provided at a central region with a screw 281 adapted to be entwisted into the shaft 278 to prevent the sun gear 265 and the planet gear 266 from dropping off.

An upper wall of the gear case 279 is provided with an inner rib 279a adapted to come in contact with the sun gear 265 and a bottom wall is provided with an inner rib 279b adapted to come in contact with the planet gear 266.

Said gear case 279 is further provided with an internal gear 282 adapted to cooperate with the sun gear 265 to guide the movement of the planet gear 266.

Figure 32:
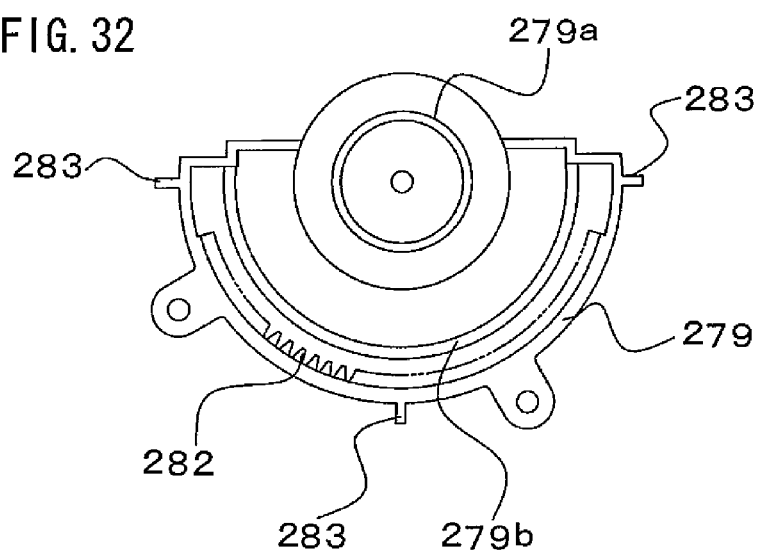
FIG. 32 is a rear view showing the gear case included by the control device according to the seventh embodiment.

As FIG. 32 illustrates in an enlarged scale, the gear case 279 is provided with the circular arc-shaped internal gear 282 so that the planet gear 266 is rotated and moved by the driving force from the sun gear 265 between this internal gear 282 and the sun gear 265.

FIG. 32 is a rear view of the gear case 279.

Said gear case 279 includes along its periphery one or more tongue 283 so that this or these tongue(s) may be fitted into the associated positioning groove(s) 277b formed in the rear base 277 for positioning and then affixed to the rear base 277 by means of screws 280, 281.

Regarding the internal gear 282, instead of providing the internal gear 282 in the gear case 279, it may be provided in the form of a circular arc-shaped gear on the rear base to guide the planet gear 266 as properly as the internal gear 282 provided in the gear case 279.

Said planet gear 266 is provided with a projecting connector 266a to which the inner cable 284a of the control cable 284 is connected.

Figure 30:
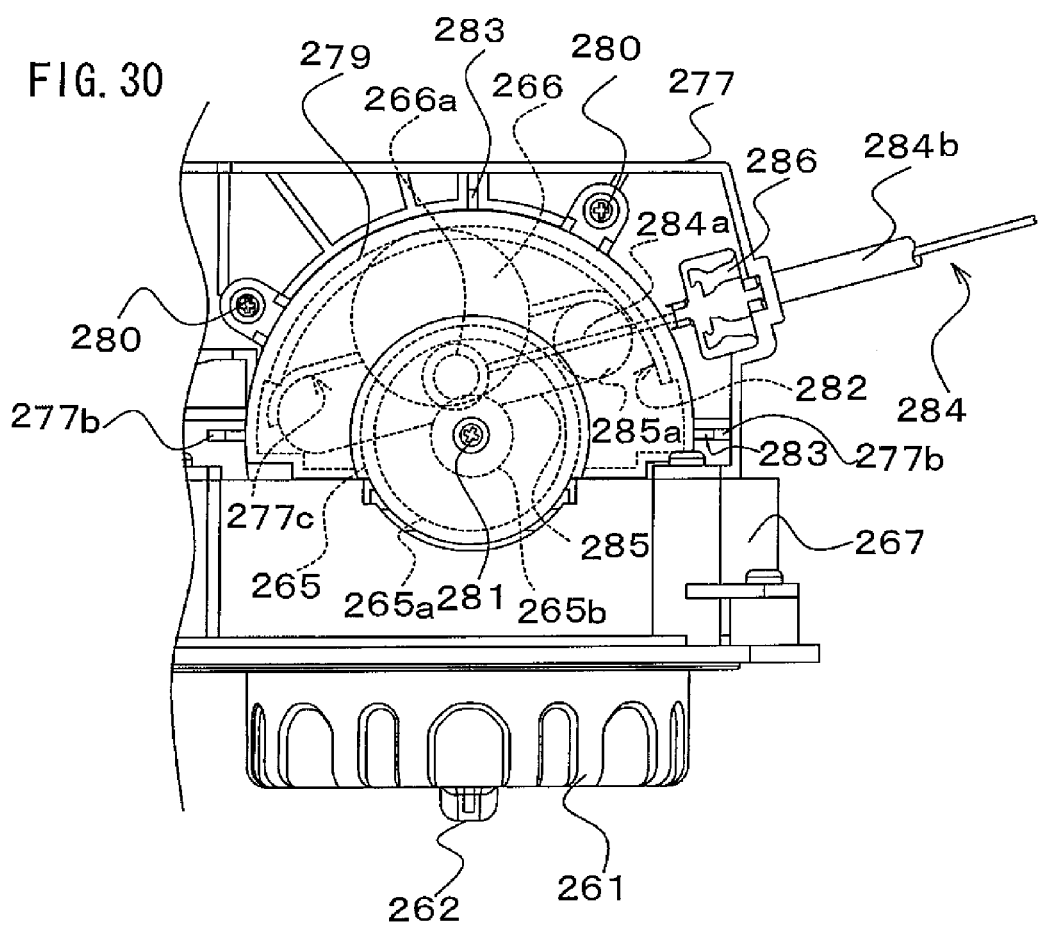
FIG. 30 is a partial plan view showing the control device according to the seventh embodiment.

As will be apparent from FIGS. 28 and 30, the projecting connector 266a extends downward at an eccentric position with respect to the rotation center of the planet gear 266 through a square U-shaped groove 285 formed in the planar portion 277a of the rear base 277 to the rear side of the planar portion 277a.

FIG. 15 is a partial plan view showing an interlocking mechanism of the control knob 131 and FIG. 16 is a plan view showing the same interlocking mechanism but with the gear case 149 removed to reveal the inner construction.

The square U-shaped groove 285 is provided in the form of a rectilinear slot having a length corresponding to a distance along which the projecting connector 266a can move as the control knob 131 is operated in its maximum rotational range.

Specifically, the sun gear 265 as well as the planet gear 266 may be appropriately designed and the projecting connector 266a may be located eccentrically with respect to the planet gear 266 to ensure that the projecting connector 266a moves substantially along a rectilinear path as the planet gear 266 moves around the sun gear 265.

The square U-shaped groove 285 is provided at one end with an opening 285a so that the inner cable 284a having one end connected to the projecting connector 266a may be drawn out through this opening 285a. The outer cable 284b containing therein the inner cable 284a is held by the cable holder (i.e., clamp member) 286 as seen in FIG. 27.

Figure 31:
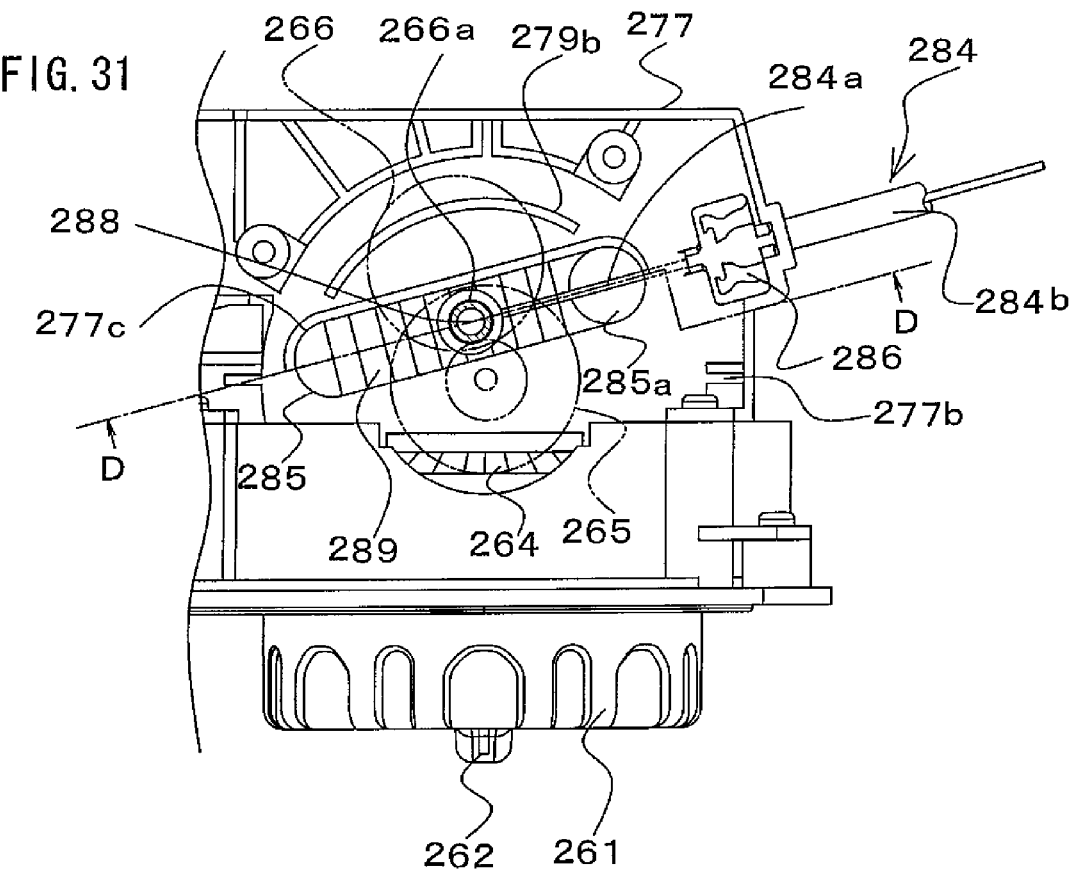
FIG. 31 is a partial plan view showing the control device according to the seventh embodiment as the gear case has been removed to reveal the inner structure.

FIG. 30 is a partial plan view showing the interlocking mechanism of the control knob 261 and FIG. 31 is a plan view showing the same interlocking mechanism with the gear case removed to reveal the inner construction.

According to this seventh embodiment, the projecting connector 266a of the planet gear 266 is formed with the elongate pit 266b, as seen in FIGS. 28, 29 and 31, containing the spring-loaded small ball 288 (serving as the operational feel giving member). As will be seen in FIGS. 31 and 33, the bottom of the square U-shaped groove 285 with which the projecting connector 266a comes in contact is formed with a plurality of operational feel giving depressions (operational feel giving depressions) against which the small ball 288 is pressed under the biasing effect of the spring 287.

As will be easily appreciated, these depressions are arranged at the intervals corresponding to the intervals of the symbols 263a arranged at the targets to which the control knob 261 is rotated.

Figure 33:
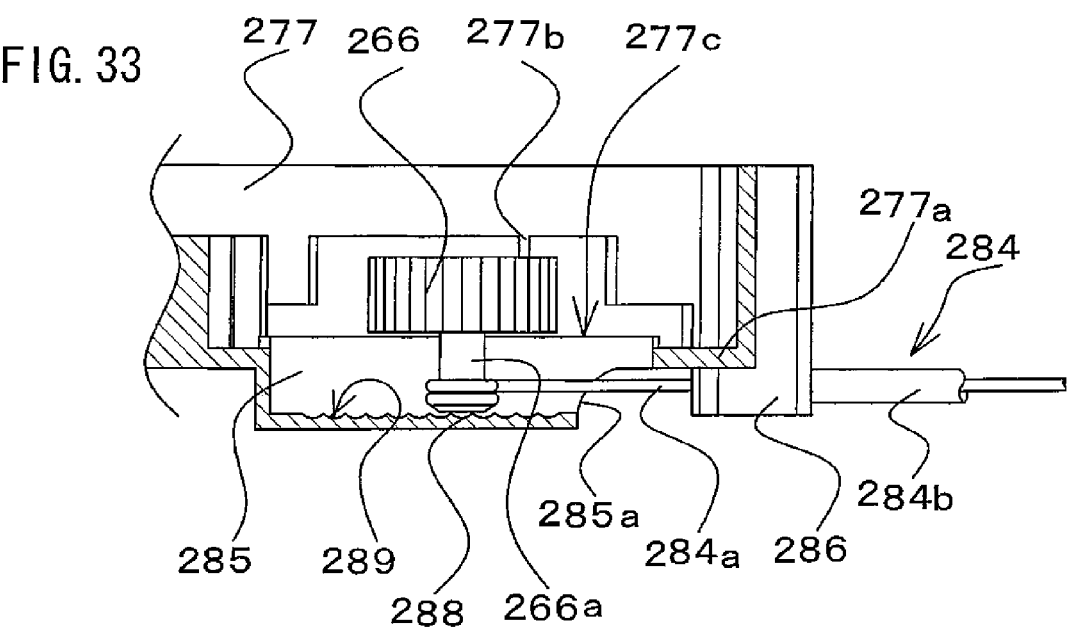
FIG. 33 is a partial sectional view showing an operational feel giving mechanism incorporated in the control device according to the seventh embodiment.

FIG. 33 is a sectional view taken along a line D-D in FIG. 31.

In the case of the control device according to the seventh embodiment as has been described above, the control knob 261 may be rotated until its indicator 261a is aligned with the desired symbol 263a to assure that the sun gear 265 engaging with the interlocking gear 264 rotating integrally with the control knob 261 is rotated around the shaft 278.

In consequence, the planet gear, 266 engaging with spur gear 265b of the sun gear 265 is driven by the sun gear 265 and moved under the guiding by the sun gear 265 and the internal gear 282 while the planet gear 266 rotates on its axis.

In this way, the projecting connector 266a also moves in response to rotation of the control knob 261 and, in the course of movement, the projecting connector 266a drops in one of the operational feel giving depressions 289 corresponding to the rotational position (at which the indicator 261a is aligned with the desired symbol 263a) of the control knob 261. At this moment, a slight rotation braking force (i.e., operational feel) is exerted on the control knob 261.

In consequence, the inner cable 284a of the control cable 284 is advanced or retracted, causing the air conditioning unit to regulate the temperature.

The control knob 262 is rotated with the projecting finger-grip held with the fingers until the indicator 262a is aligned with the desired symbol 263b.

The airflow regulating switch 276 is turned on and thereby the fan motor for airflow regulation is controlled.

While the control knob 261, the control knob 262 and the interlocking mechanisms thereof have been described, it should be understood that the other control knob 291 is for wind direction regulation and the interlocking mechanism associated with this control knob 291 has the same construction as the interlocking mechanism associated with the control knob 261.

Specifically, the control knob 291 may be rotated until the indicator 291a thereof is aligned with the desired symbol 292a to ensure that the interlocking gear 293, the sun gear 294 and the planet gear 296 are interlocked one with another. Thus, the projecting connector 295a of the planet gear 295 moves and the inner cable 290a of the control cable 290 is advanced or retracted.

In this way, the wind direction is exchanged in the air conditioning unit.

The interlocking mechanism associated with the control knob 291 also is provided with the operational feel giving mechanism comprising the small ball 288 and a plurality of the depression 289 as has been described above. In the course of rotating the control knob 291 so as to align the indicator with the respective symbols 292a, the operator of the control knob 291 experiences slight braking force (i.e., operational feel of the control knob).

The control cable 296 includes the outer cable 296b slidably containing therein the inner cable 296a.

Within the cylindrical control knob 291, there are disposed the respective push buttons 297, 298, 299 for the rear defroster switch, the air conditioning switch and the indoor air circulation/outdoor air intake switch.

When these push buttons 297, 298, 299 are depressed, sliders 300a, 300b, 300c shown in FIG. 29 are moved and thereby actuate push switches 301a, 301b, 301c mounted on the wiring substrate 272.

In FIG. 29, reference numerals 302, 303, 304 designate light guiding members, reference numeral 305 designates a lamp for night lighting, reference numeral 306 designates the display plate for the symbol 292a, and reference numeral 307 designates the gear case.

The front bas 267 and the rear base 277 are fixed together by means of screws and a panel member 308 is fixed to the front surface of the front base 267.

As has previously been described, the stroke of the inner cable 284a of the control cable 284 depends on the position to which the projecting connector 266a of the planet gear 264 has moved (i.e., operational feel giving position) and therefore the stroke is free from affection due to a backlash between the interlocking gear 264 and the sun gear 265 or the sun gear 265 and the planet gear 266.

The inner cable 184a is free from a stroke loss and hysteresis phenomenon and provides for air conditioning of high precision.

Even when the control knob is rotated over a wide range, such wide range of rotation is effectively reduced when transmitted to the planet gear 266 and a moving range of the projecting connector is also reduced.

Consequently, the small ball 288 associated with the projecting connector 266a reliably cooperates with the respective depressions 289 one by one and therefore it is not apprehended that the control knob 261 might stop before the small ball 288 moves to the next depression.

Figure 34:
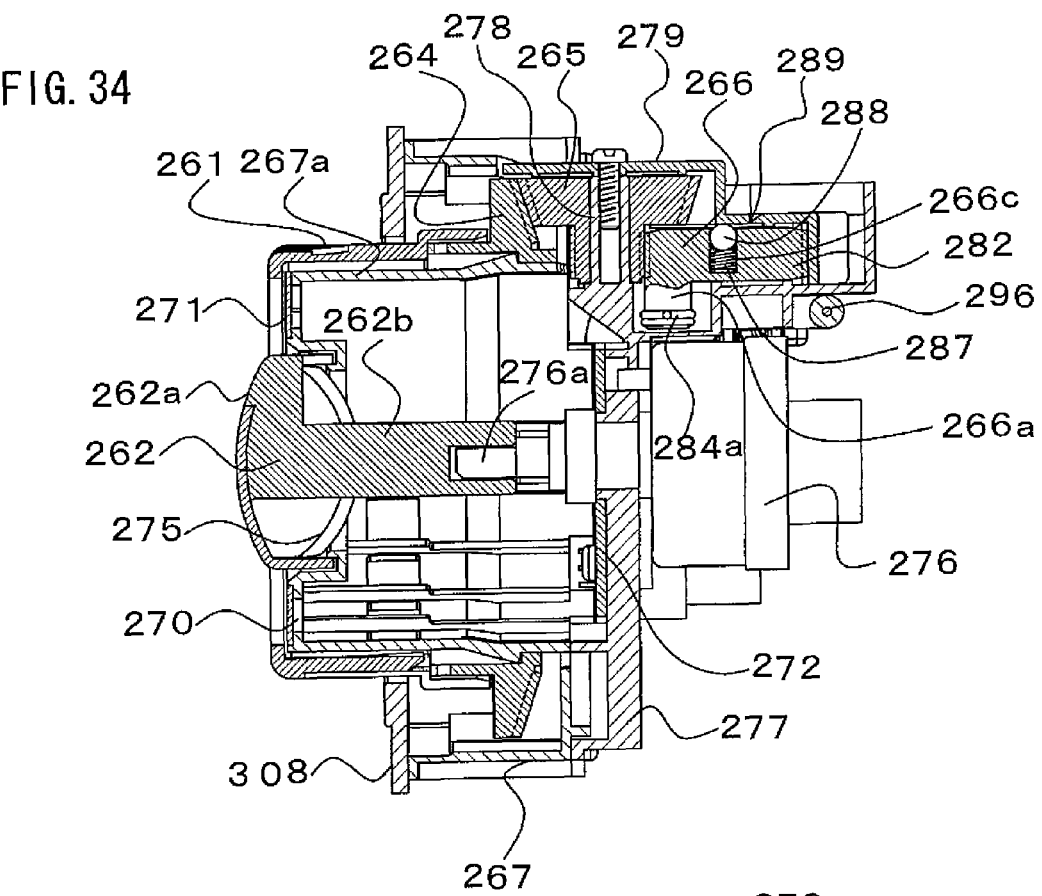
FIG. 34 is a sectional view similar to FIG. 28, showing the control device for air conditioning unit of a motor vehicle according to an eighth embodiment.

FIG. 34 is a sectional view similar to FIG. 28, showing an eighth embodiment in the form of the control device for air conditioning unit of a motor vehicle.

Figure 35:
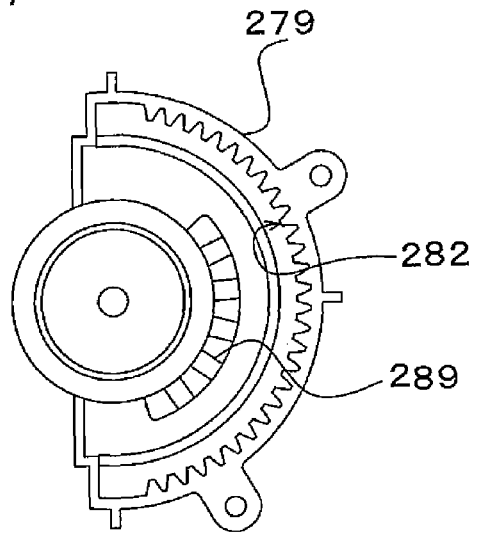
FIG. 35 is a rear view showing the gear case according to the eighth embodiment.

This embodiment is similar to said seventh embodiment except that the operational feel giving mechanism comprises the small ball 288 biased by the spring within the elongate pit formed in the central region of the planet gear 266 and the a plurality of depressions 289 formed on the inner surface of the gear case 279 against which said small ball 288 is pressed as shown by FIG. 35.

FIG. 35 is a rear view similar to FIG. 32, showing the gear case.

In the case of the control device according to this eighth embodiment, in response to rotational operation of the control knob 261, the planet gear 266 revolves around the sun gear 265 while the planet gear 266 rotates around its own axis. In this course, the small ball 288 moves from the depress 289 to the depress 289, giving the operator of the control knob 261 the operational feel of the control knob 261.

According to this embodiment, the stroke of the inner cable 284a of the control cable 284 corresponds to a movement distance of the projecting connector 266a depending on the movement of the planet gear 266. Therefore, the stroke is not affected by a backlash between the gears as in the case of the seventh embodiment.

Figure 36:
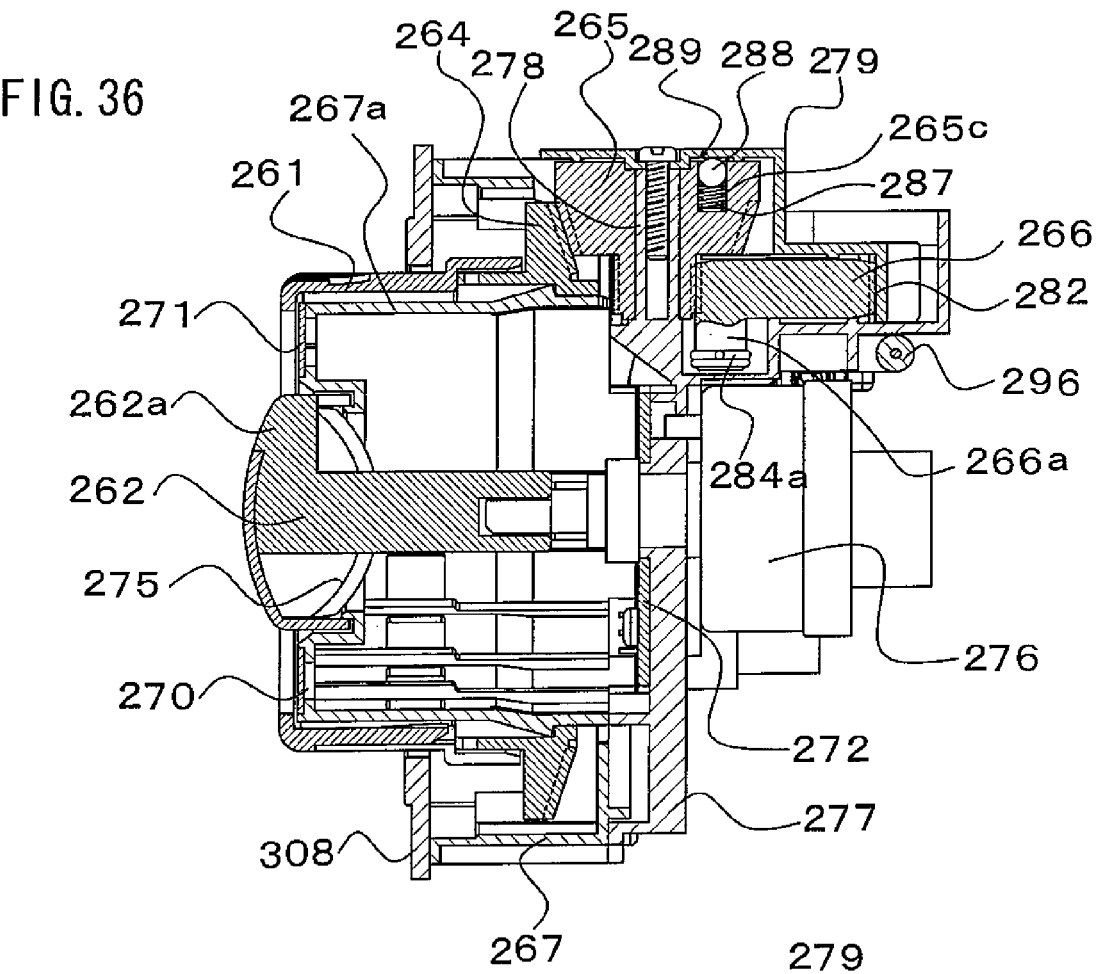
FIG. 36 is a sectional view similar to FIG. 28, showing the control device for air conditioning unit of a motor vehicle according to a ninth embodiment.

FIG. 36 is a sectional view similar to FIG. 28, showing a ninth embodiment in the form of the control device for air conditioning unit of a motor vehicle.

Figure 37:
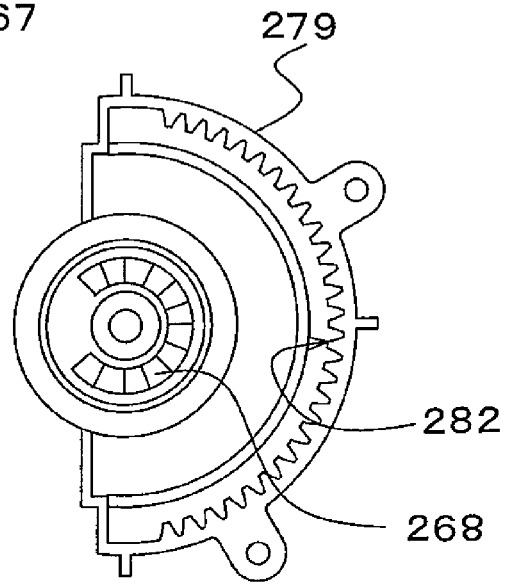
FIG. 37 is a rear view showing the gear case according to the ninth embodiment.

The present embodiment is similar to said seventh embodiment except that the operational feel giving mechanism comprises the small ball 288 biased by the spring 287 within an elongate pit 265c formed in the sun gear 265 and extending in the axial direction and a plurality of operational feel giving zones formed on the inner surface of the gear case 279 as seen in FIG. 37.

FIG. 37 is a rear view similar to FIG. 32, showing the gear case.

In the case of the control device according to this ninth embodiment, in response to rotational operation of the control knob 261, the sun gear 265 rotates and the small ball 288 moves along the respective depressions, causing the operator to experience operational feel of the control knob 261.

With this embodiment, the stroke of the inner cable 284a contained in the control cable 284 is somewhat affect by a backlash between the sun gear 265 and the planet gear 266 but a stroke loss due to such backlash is practically negligible.

Figure 38:
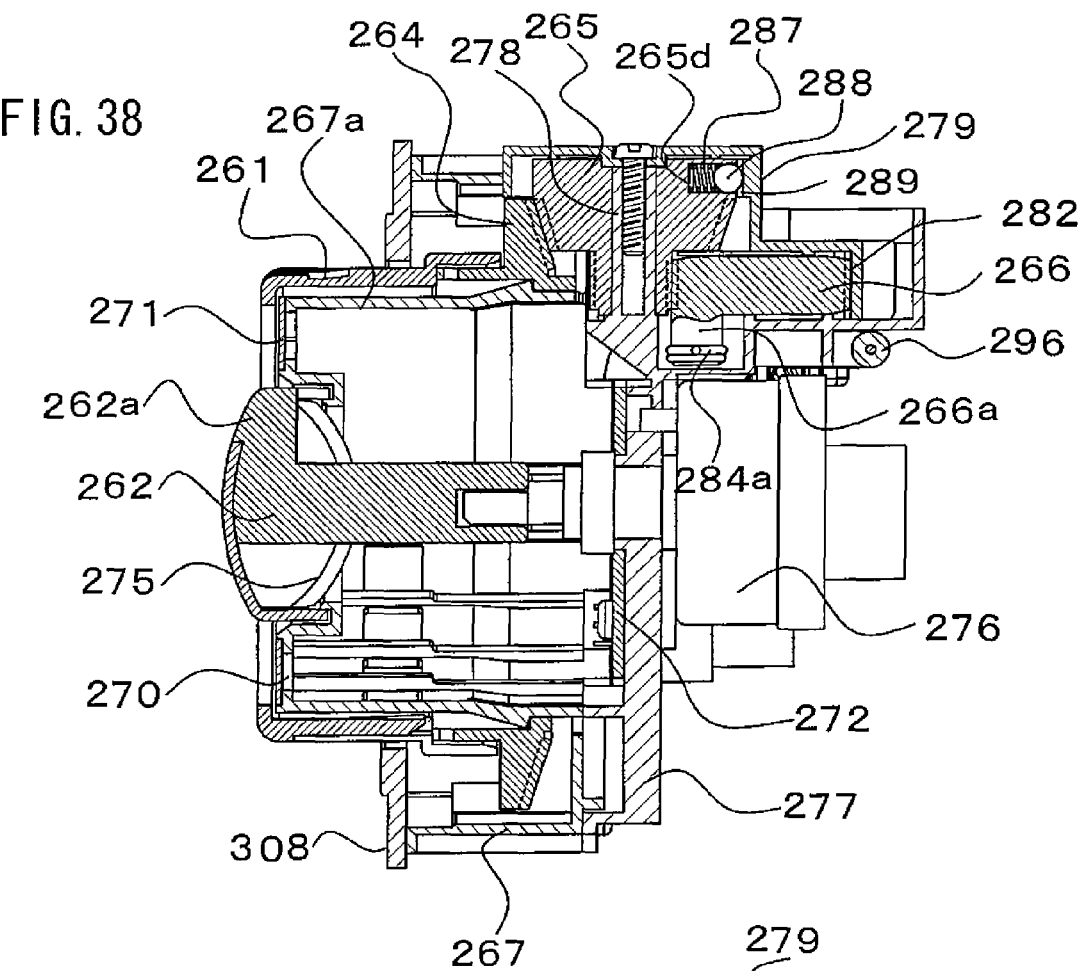
FIG. 38 is a sectional view similar to FIG. 36, showing the control device for air conditioning unit of a motor vehicle according to a variant of the ninth embodiment.

FIG. 38 is a sectional view similar to FIG. 36, showing a variant of the ninth embodiment in the form of the control device for air conditioning unit of a motor vehicle.

Figure 39:
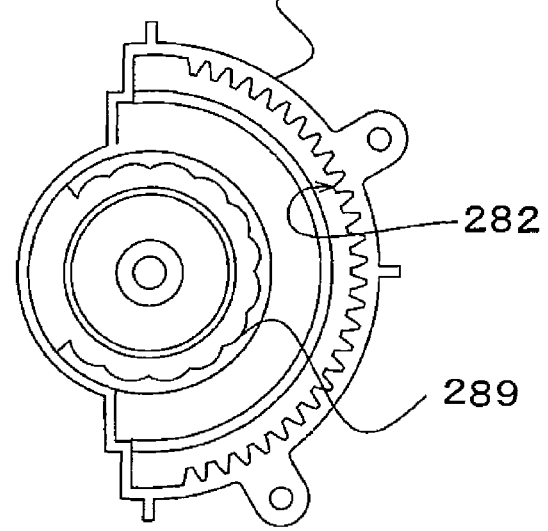
FIG. 39 is a rear view showing the gear case according to the variant of the ninth embodiment.

This variant is similar to said ninth embodiment except that the sun gear 265 is formed with an elongate pit 265d extending in radial direction and the small ball 288 is disposed within this pit 265d biased by the spring 287. In association with this, as shown by FIG. 39, the gear case 279 is formed on its inner surface with the operational feel giving depresses 289 so as to cooperate with said spring-loaded small ball 288 and thereby to provide the operational feel giving mechanism.

While this variant will be affected by a backlash occurring between the sun gear 265 and the planet gear 266, a stroke loss due to such backlash is practically negligible.

FIG. 14 is a rear view similar to FIG. 7, showing the gear case.

Figure 40:
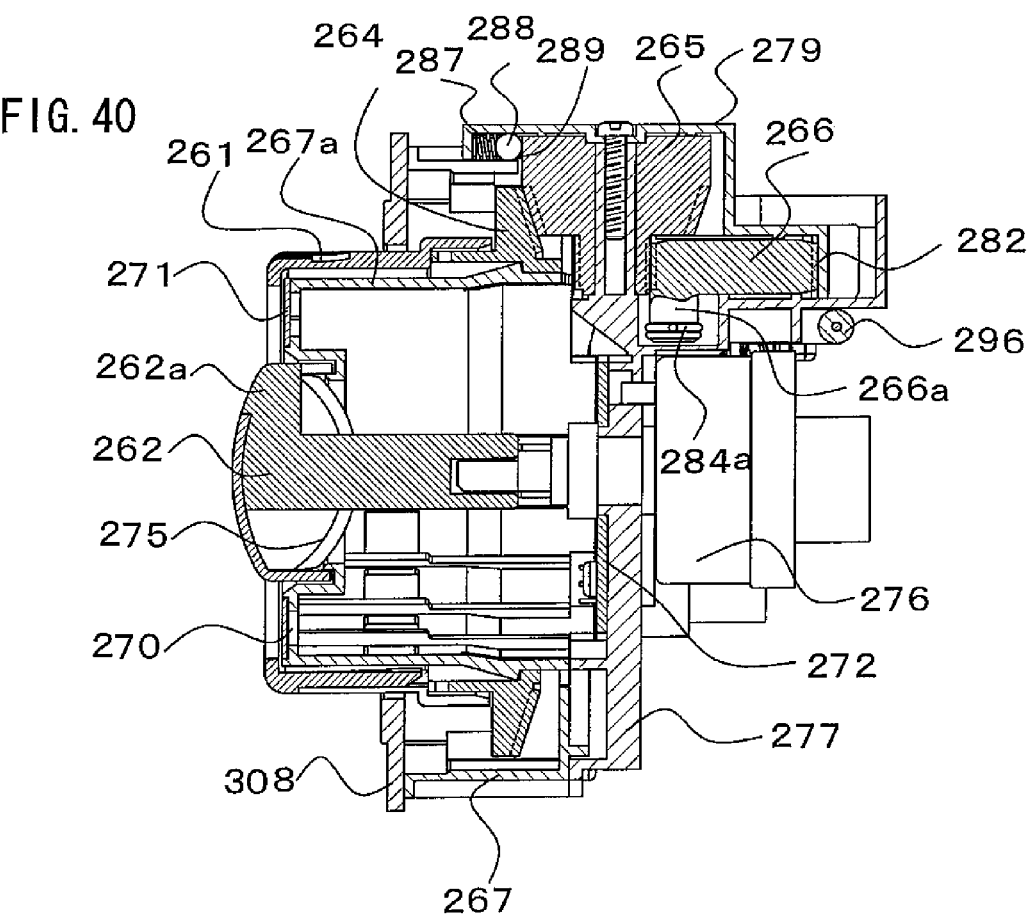
FIG. 40 is a sectional view similar to FIG. 36, showing the control device for air conditioning unit of a motor vehicle according to another variant of the ninth embodiment.

FIG. 40 is sectional view similar to FIG. 36, showing the control device for air conditioning unit of a motor vehicle according to another variant of the ninth embodiment.

Figure 41:
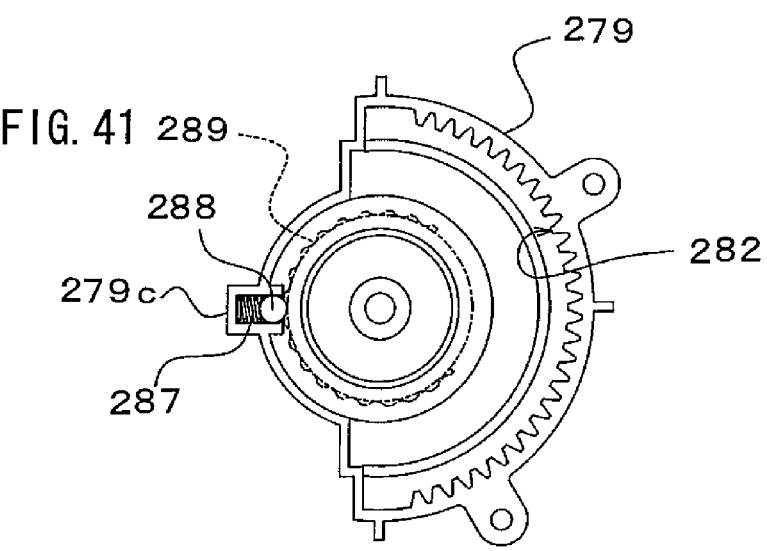
FIG. 41 is a rear view showing the gear case according to another variant of the ninth embodiment.
Figure 42:
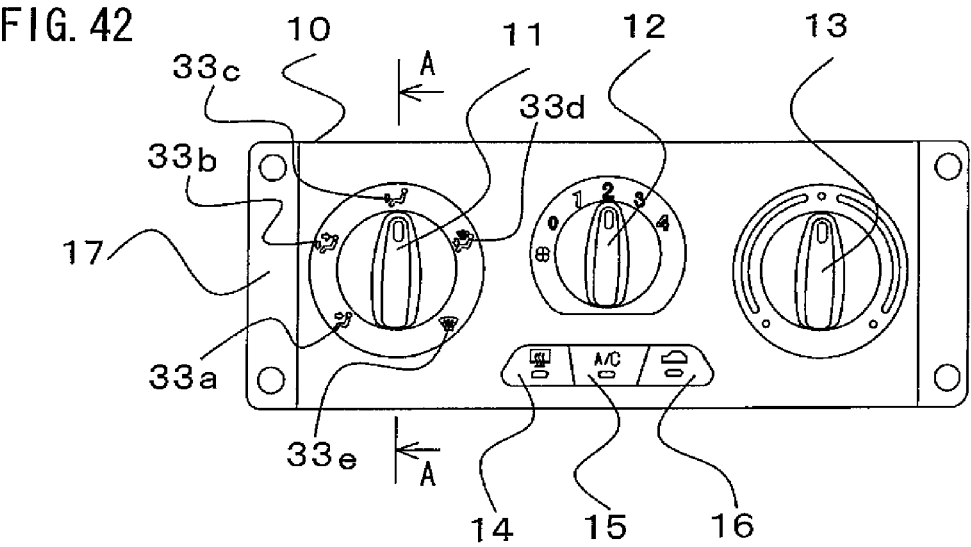
FIG. 42 is a front view exemplarily showing the control devices of prior art.
Figure 43:
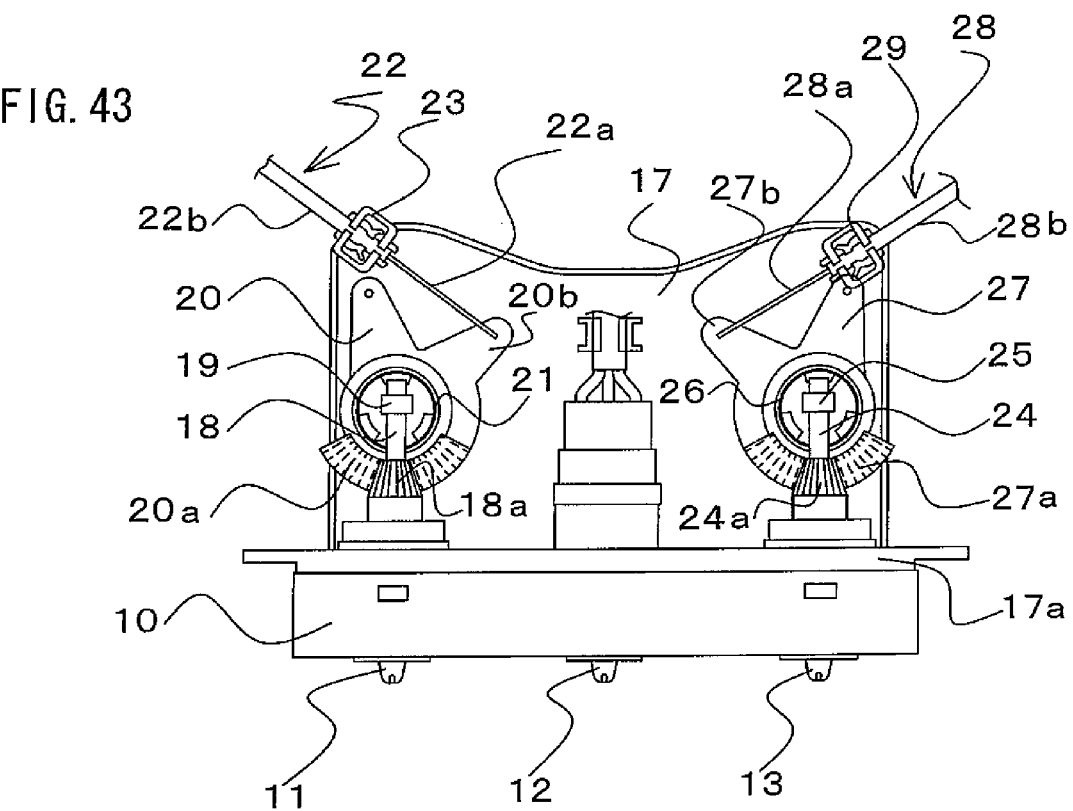
FIG. 43 is a plan view of the control device of prior art shown by FIG. 42.
Figure 44:
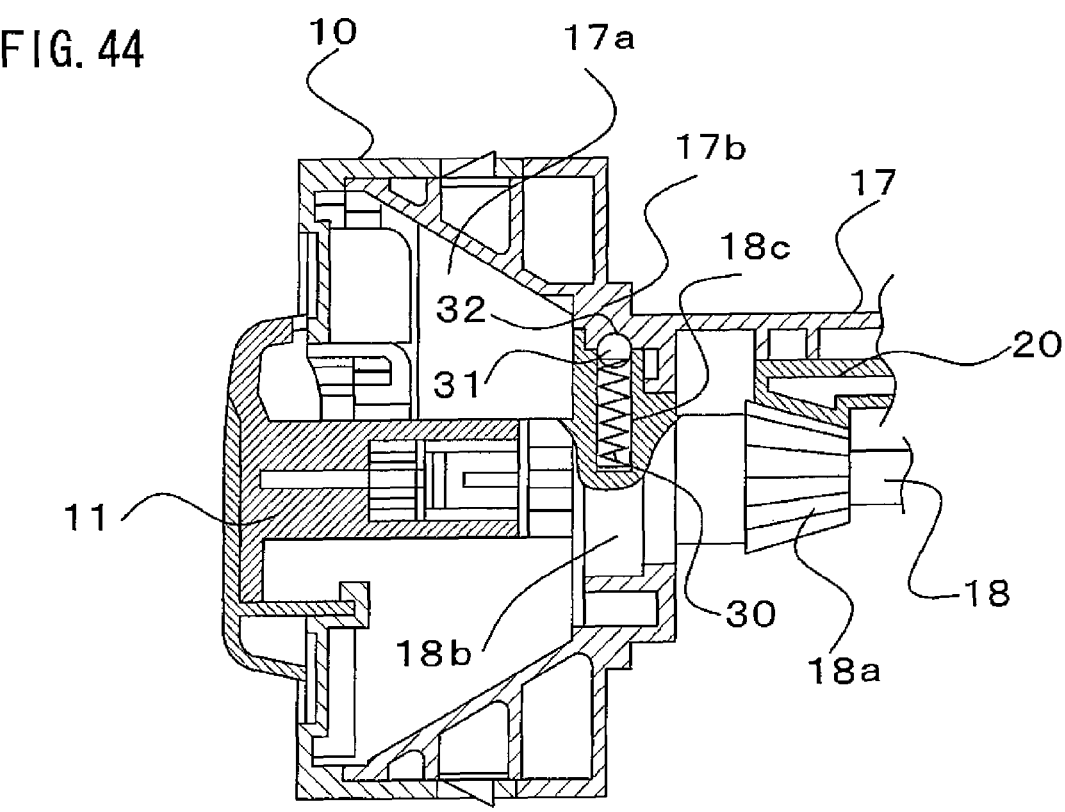
FIG. 44 is a partial sectional view of the control device of prior art shown by FIG. 42.
Figure 45:
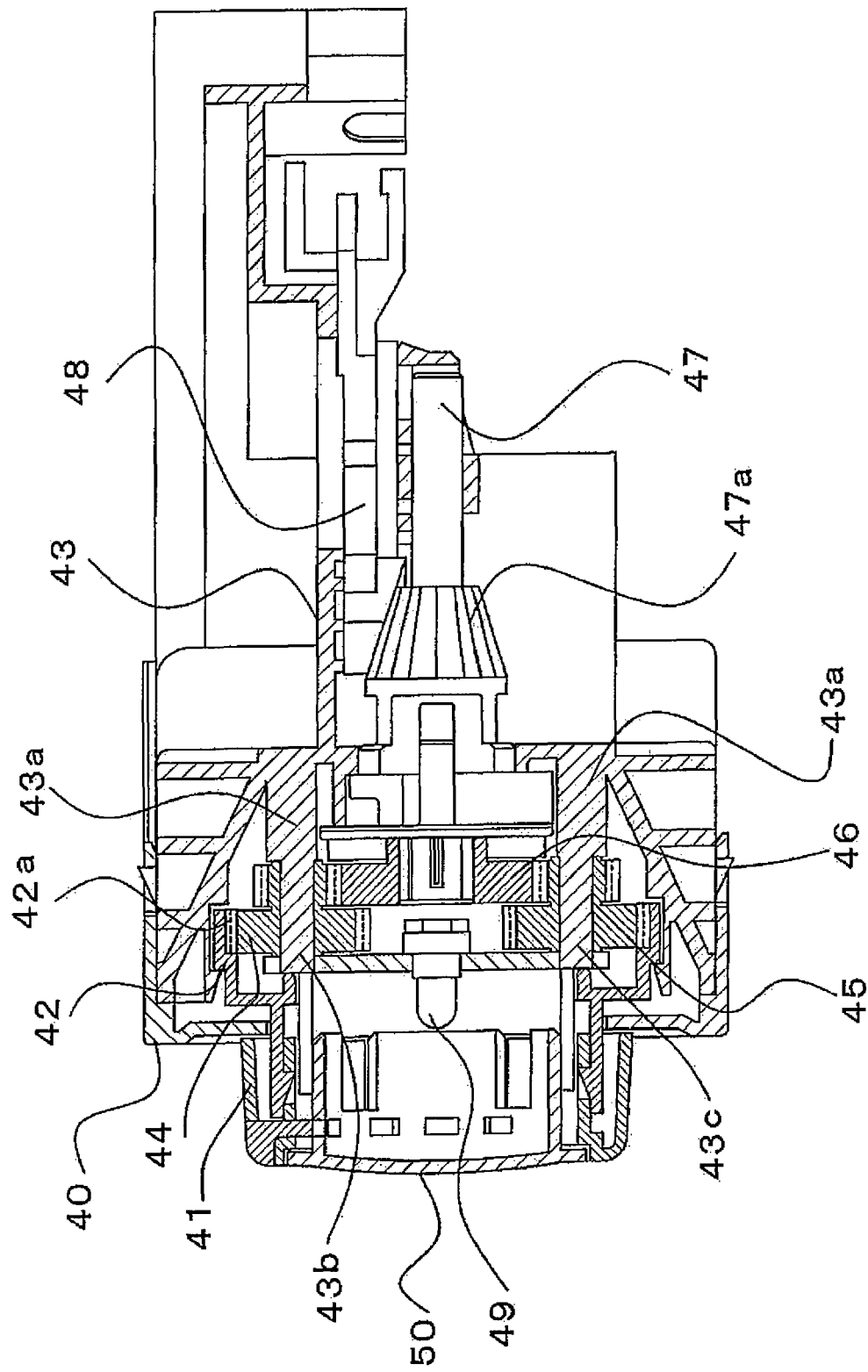
FIG. 45 is a sectional view exemplarily showing another control device of prior art.

The variant is similar to said ninth embodiment except that the operational feel giving mechanism comprises the small ball 288 biased by the spring 287 within the recess 279c formed in the gear case 279 and a plurality of depressions 289 formed on a periphery of the sun gear 265 as shown in FIG. 41.

While this variant also is affected by a backlash between the sun gear 265 and the planet gear 266, a stroke loss due to such backlash is practically negligible.

FIG. 41 is a rear view similar to FIG. 32, showing the gear case.

The eight and the ninth embodiments as well as the variants are applicable not only to the interlocking mechanism for the control knob 261 but also to the interlocking mechanism for the control knob 291.

While the respective embodiments have been described above, the present invention should not be construed to be limited to the control device for air conditioning unit of a motor vehicle but to the other various control devices adapted to control operation of the external devices by rotationally operating the dial control devices.

What is claimed is:

1. A dial control device comprising:
   a cylindrical control knob,
   a sun gear, comprised of a spur gear, rotating integrally with said control knob for transmission of a driving force from said control knob,
   a planet gear, comprised of a spur gear, interlocked with said sun gear, rotating on its axis while turning around said sun gear,
   an internal gear, circularly formed around said sun gear, cooperating with said sun gear to guide said planet gear in a direction of its movement, and
   a control cable coupled to said planet gear and moved as said planet gear turns, so as to operate an external device,
   wherein said planet gear is arranged to be interlocked with each gear between said sun gear and said internal gear, and
   wherein said driving force generated by rotational operation of said control knob is transmitted via said sun gear, said planet gear and said control cable to the external device to control operation of said external device.

2. The dial control device as recited by claim 1, wherein said cylindrical control knob includes therein another control knob adapted to perform an operational control independent from the operational control performed by said control cable.

3. The dial control device as recited by claim 1, comprising:
   a base member rotatably supporting said control knob,
   said control cable having an outer cable slidably containing therein an inner cable, and
   a clamp member mounted on said base member and adapted to fix one end of said outer cable at a predetermined position,
   wherein said inner cable is connected to said planet gear at an eccentric location spaced from a rotational center of said planet gear and said clamp member is placed on an extension of a line connecting a pair of opposite ends of movement locus of said eccentric location within a rotatable range of said control knob.

4. The dial control device as recited by claim 1, comprising:
   a base member rotatably supporting said control knob,
   said control cable having an outer cable slidably containing therein an inner cable,
   a clamp member mounted on said base member and adapted to fix one end of said outer cable at a predetermined position,
   an interlocking gear, comprised of a bevel gear integrally mounted on said control knob,
   said planet gear in the form of a spur gear arranged on said base member, and
   said sun gear including a bevel gear engaging said interlocking gear and a spur gear engaged with said planet gear and rotatably supported by said base member.

5. A dial control device comprising:
   a cylindrical control knob,
   a sun gear rotating in association with rotational operation of said control knob and transmitting a driving force from said control knob,
   a planet gear rotating on its axis while turning around said sun gear and moving in association with said sun gear on a planar portion of a base member rotatably supporting said control knob and said sun gear,
   said base member having an internal gear, circularly formed around said sun gear, cooperating with said sun gear to guide said planet gear in a direction of its movement, and
   a cable holder for a control cable coupled to said planet gear and moved as said planet gear turns, so as to operate an external device,
   wherein said planet gear is arranged to be interlocked with each gear between said sun gear and said internal gear, and
   wherein said planar portion of the base member is formed with an elongate notch and said planet gear is provided with a projecting connector adapted to be movably inserted into said notch and connected to said control cable behind said planar portion.

6. The dial control device as recited by claim 5, wherein said planar portion of the base member is formed with an elongate square U-shaped notch and said planet gear is provided with a projecting connector adapted to be movably inserted into said square U-shaped notch and connected to said control cable within said square U-shaped notch.

7. The dial control device as recited by claim 5, wherein said cylindrical control knob includes therein an operating member adapted to perform an operational control independent from the operational control performed by said control cable.

8. The dial control device as recited by claim 5, wherein:
   said control cable comprises an outer cable slidably containing therein an inner cable,
   said base member is provided with a cable holder adapted to fix one end of said outer cable,
   said planet gear is provided at an eccentric location spaced from its rotational center with a cable holder,
   said clamp member is placed on an extension of a line connecting a pair of opposite ends of movement locus of said eccentric location within a rotatable range of said control knob.

9. The dial control device as recited by claim 5, comprising:
   an interlocking gear forming a bevel gear and integrally mounted on said control knob,
   said planet gear formed of a spur gear disposed on said base member so as to rotate around its axis, while turning, and
   said sun gear integrally consisting of a bevel gear adapted to engage with said interlocking gear and a spur gear having a diameter smaller than a diameter of said bevel gear and adapted to engage with said planet gear, said sun gear being rotatably supported by said base member with said spur gear placed aside toward the base member.

10. A dial control device comprising:
    a cylindrical control knob,
    a sun gear in association with rotational operation of said control knob and serving for transmission of a driving force from said control knob,
    a planet gear rotating on its axis while turning around said sun gear and moving in association with said sun gear on a planar portion of a base member rotatably supporting said control knob and said sun gear, and
    said base member having a cable holder for a control cable coupled to said planet gear and moved as said planet gear turns, so as to operate an external device,
    wherein a gear case provided with an internal gear, circularly formed around said sun gear, cooperating with said sun gear to guide said planet gear in a direction of its movement is fixed to said base member, wherein said planet gear is arranged to be interlocked with each gear between said sun gear and said internal gear, and wherein a driving force generated as said control knob is rotationally operated is transmitted via said sun gear, planet gear and control cable to an external device and thereby operation of the external device is controlled.

11. The dial control device as recited by claim 10, comprising:
an interlocking gear forming a bevel gear and integrally mounted on said control knob,
said planet gear comprising a spur gear and arranged on said base member, so as to rotate around its axis, while turning, and
said sun gear consisting of a bevel gear adapted to engage with said interlocking gear and a spur gear adapted to engage with said planet gear and rotatably supported by said base member and said gear case.

12. A dial control device comprising:
a cylindrical control knob,
an interlocking gear in the form of a bevel gear integrally mounted on said control knob,
a sun gear adapted to engage with said interlocking gear and serving for transmission of a driving force from said control knob,
a base member rotatably supporting said control knob, said interlocking gear and said sun gear is provided with a planet gear adapted to move in association with said sun gear by rotating around its axis while turning around said sun gear,
said base member is provided with an internal gear, circularly formed around said sun gear, cooperating with said sun gear to guide said planet gear in the direction of its movement and with a control cable associated with said planet gear and moved as said planet gear turns, to operate an external device,
said planet gear being arranged to be interlocked with each gear between said sun gear and said internal gear, and
said planet gear is provided with an operational feel giving member adapted to be pressed against an operational feel giving member provided on said base member.

13. A dial control device comprising:
a cylindrical control knob,
an interlocking gear in the form of a bevel gear integrally mounted on said control knob,
a sun gear having a bevel gear and another spur gear, adapted to engage with said interlocking gear and serving for transmission of a driving force from said control knob,
a base member rotatably supporting said control knob, said interlocking gear and said sun gear is provided with a planet gear adapted to move in association with said sun gear by rotating around its axis while turning around said sun gear,
said base member is provided with an internal gear, circularly formed around said sun gear, cooperating with said sun gear to guide said planet gear in the direction of its movement and with a control cable associated with said planet gear and moved as said planet gear turns, to operate an external device,
said planet gear being arranged to be interlocked with each gear between said sun gear and said internal gear,
said planar portion of the base member is formed with an elongate square U-shape notch and said planet gear is provided with a projecting connector adapted to be movably inserted into said square U-shape notch and to connect said control cable within said square U-shape notch to said planet gear, and
said square U-shape notch is formed on its bottom with an operational feel giving mechanism comprising a plurality of depressions while said projecting connector is provided with an operational feel giving member adapted to be pressed against said depression under a biasing effect.

14. A dial control device comprising:
a cylindrical control knob,
an interlocking gear in the form of a bevel gear integrally mounted on said control knob,
a sun gear having a bevel gear and another spur gear adapted to engage with said interlocking gear and serving for transmission of a driving force from said control knob,
a base member rotatably supporting said control knob, said interlocking gear and said sun gear is provided with a planet gear adapted to move in association with said sun gear by rotating around its axis while turning around said sun gear,
said base member is provided with a gear case including therein a control cable associated with said planet gear and moved as said planet gear turns, to operate an external device, said sun gear, said planet gear and an internal gear, circularly formed around said sun gear, cooperating with said sun gear to guide said planet gear in a direction of its movement,
said planet gear being arranged to be interlocked with each gear between said sun gear and said internal gear, and
said gear case is provided with an operational feel giving portions while said planet gear is provided with an operational feel giving member adapted to be pressed against said operational feel giving portions under a biasing effect.

* * * * *